(12) United States Patent
Ohmi et al.

(10) Patent No.: US 6,848,470 B2
(45) Date of Patent: Feb. 1, 2005

(54) PARALLEL DIVIDED FLOW-TYPE FLUID SUPPLY APPARATUS, AND FLUID-SWITCHABLE PRESSURE-TYPE FLOW CONTROL METHOD AND FLUID-SWITCHABLE PRESSURE-TYPE FLOW CONTROL SYSTEM FOR THE SAME FLUID SUPPLY APPARATUS

(75) Inventors: Tadahiro Ohmi, 1-17-301, Komeqahukuro 2-chome, Aoba-ku, Sendai-shi, Miyagi 980-0813 (JP); Satoshi Kagatsume, Nirasaki (JP); Kazuhiko Sugiyama, Nirasaki (JP); Yukio Minami, Osaka (JP); Kouji Nishino, Osaka (JP); Ryousuke Dohi, Osaka (JP); Katsunori Yonehana, Osaka (JP); Nobukazu Ikeda, Osaka (JP); Michio Yamaji, Osaka (JP); Jun Hirose, Nirasaki (JP); Kazuo Fukazawa, Nirasaki (JP); Hiroshi Koizumi, Nirasaki (JP); Hideki Nagaoka, Nirasaki (JP); Akihiro Morimoto, Osaka (JP); Tomio Uno, Osaka (JP); Eiji Ideta, Osaka (JP); Atsushi Matsumoto, Osaka (JP); Toyomi Uenoyama, Osaka (JP); Takashi Hirose, Osaka (JP)

(73) Assignees: Fujikin Incorporated, Osaka (JP); Tadahiro Ohmi, Miyagi (JP); Tokyo Electron Ltd., Tokyo (JP)

( * ) Notice: Subject to any disclaimer, the term of this patent is extended or adjusted under 35 U.S.C. 154(b) by 0 days.

(21) Appl. No.: 10/775,104

(22) Filed: Feb. 11, 2004

(65) Prior Publication Data

US 2004/0154664 A1 Aug. 12, 2004

Related U.S. Application Data

(60) Continuation of application No. 10/162,552, filed on Jun. 6, 2002, which is a division of application No. 09/734,640, filed as application No. PCT/JP00/02160 on Apr. 3, 2000, now Pat. No. 6,422,264.

(30) Foreign Application Priority Data

| Apr. 16, 1999 | (JP) | ............................................. 11-108689 |
| May 10, 1999 | (JP) | ............................................. 11-129109 |
| Apr. 3, 2000 | (JP) | ................................. PCT/JP00/02160 |

(51) Int. Cl.$^7$ ................................................. G05D 7/06
(52) U.S. Cl. ...................... 137/487.5; 137/486; 700/282
(58) Field of Search .............................. 137/486, 487.5; 118/692, 715; 700/282

(56) References Cited

U.S. PATENT DOCUMENTS

| 5,146,941 | A | 9/1992 | Statler |
| 5,633,212 | A | 5/1997 | Yuuki |

(List continued on next page.)

FOREIGN PATENT DOCUMENTS

| JP | 5-341849 | * 12/1993 |

*Primary Examiner*—Ramesh Krishnamurthy
(74) *Attorney, Agent, or Firm*—Griffin & Szipl, P.C.

(57) ABSTRACT

A fluid supply apparatus with a plurality of flow lines branching out from one pressure regulator with the flow lines arranged in parallel and constructed so that opening or closing one flow passage will have no transient effect on the steady flow of the other flow passages. Each flow passage is provided with a time delay-type mass flow controller MFC so that when one closed fluid passage is opened, the mass flow controller on that flow passage reaches a set flow rate $Q_s$ in a specific delay time $\Delta t$ from the starting point.

The invention includes a method and an apparatus in which a plurality of gas types can be controlled in flow rate with high precision by one pressure-type flow control system.

7 Claims, 17 Drawing Sheets

U.S. PATENT DOCUMENTS

| | | |
|---|---|---|
| 5,669,408 A | 9/1997 | Nishino et al. |
| 5,816,285 A | 10/1998 | Ohmi et al. |
| 5,868,159 A | 2/1999 | Loan et al. |
| 5,911,238 A | 6/1999 | Bump et al. |
| 5,975,126 A | 11/1999 | Bump et al. |
| 6,012,474 A | 1/2000 | Takamoto et al. |
| 6,093,662 A | 7/2000 | Ohmi et al. |
| 6,210,482 B1 | 4/2001 | Kitayama et al. |
| 6,422,264 B2 | 7/2002 | Ohmi et al. |

\* cited by examiner

US 6,848,470 B2

PARALLEL DIVIDED FLOW-TYPE FLUID SUPPLY APPARATUS, AND FLUID-SWITCHABLE PRESSURE-TYPE FLOW CONTROL METHOD AND FLUID-SWITCHABLE PRESSURE-TYPE FLOW CONTROL SYSTEM FOR THE SAME FLUID SUPPLY APPARATUS

This application is a continuation of U.S. application Ser. No. 10/162,552, filed Jun. 6, 2002, which is a divisional of U.S. application Ser. No. 09/734,640, filed Dec. 13, 2002, which is now U.S. Pat. No. 6,422,264. The entire disclosures of the above applications and U.S. Pat. No. 6,422,264 are hereby incorporated by reference.

BACKGROUND OF THE INVENTION

1. Field of the Invention

The present invention relates to an apparatus for supplying gases or the like for use in the production of semiconductors, chemicals, precision machine parts, etc. More specifically, this invention relates to a parallel divided flow type fluid supply apparatus so configured that when any one of a plurality of flow passages arranged in parallel is opened for fluid to flow, the effect of that operation on the flow rates in other flow passages is minimized.

The present invention also relates to a method of controlling the flow rates of various gases used in an apparatus for supplying gases or the like for use in the production of semiconductors, chemicals, precision machine parts, etc. More specifically, this invention relates to a fluid switchable pressure-type flow control method and a fluid switchable pressure-type flow control system (FCS) in which the flow of various gases can be regulated with high precision by one pressure-type flow control system on the basis of flow factors.

2. Background Art

So-called mass flow controllers are now used in almost all fluid supply apparatuses for manufacturing facilities of semiconductors or chemicals.

FIG. 14 shows an example of the prior art single flow passage-type fluid supply apparatus in which such material gases G are adjusted by a regulator RG from primary pressure to secondary pressure before being sent into the flow passage. The primary pressure is usually a relatively higher pressure and detected by a pressure gauge Po. The secondary pressure is a relatively lower pressure under which the fluid is supplied to the downstream flow passage. The secondary pressure is measured by a pressure gauge $P_1$.

A mass flow controller MFC is installed between valves $V_1$ and $V_2$ for control of the flow. Also provided is a mass flow meter MFM to measure the flow rate. The material gas G is used for a treatment reaction or the like in the reaction chamber C and then discharged by vacuum pump VP through a valve VV.

This single flow passage-type supply apparatus presents no problem with the treatment reaction remaining stable in the reaction chamber C as long as the material gas G is supplied in a normal state with no external disturbances or changes in flow rate.

But a problem is encountered with an arrangement in which material gas G is supplied through one regulator and branched off into two or more flow passages. FIG. 15 shows an arrangement in which the flow of the material gas 6 from one regulator RG branches off to two flow passages $S_1$ and $S_2$. In practice, a reaction chamber (not shown) is also provided on flow passage $S_2$ and is so arranged that gas reaction may proceed into the two reaction chambers. The same elements or components as in FIG. 14 are indicated by the same reference characters with different suffixes given for different flow passages. Those similar elements or components will not be described gain.

An experiment was conducted to study what effect the opening of oic closed flow passage would have on the flow of another opened flow passage. In the experiment, the material gas was supplied through flow passage $S_1$ with valve $V_1$ and valve $V_2$ opened and a specific reaction proceeding in the reaction chamber C, while the flow passage $S_2$ remained closed with valve $V_3$ and valve $V_4$ closed. Then, the valve $V_3$ and valve $V_4$ were opened to supply the gas into the flow passage $S_2$ at a specific set flow rate by quickly actuating mass flow controller $MFC_2$.

FIG. 16 shows the time charts of various signals. The instant the valve $V_3$ and valve $V_4$ were opened, $MFC_2$ and $MFM_2$ signals on flow passage $S_2$ overshot to a high peak and then fell to a constant level.

The overshooting or the transient state caused the signals of $MFC_1$ and $MFM_1$ on flow passage $S_1$ to change violently because of a change in pressures $P_1A$, $P_1B$.

This change in turn has an effect on the rate of reaction in the reaction chamber C. The external disturbance from flow passage $S_2$ hinders a steady reaction in the reaction chamber C on flow passage $S_1$. In the process of manufacturing semiconductors, this problem could cause lattice defects in the semiconductor. In is etching plasma, the process could be affected. In a chemical reaction, the oversupply or short supply of material gas G could cause finished products to change in concentration. This change could lead to unpredictable problems through "chaos phenomena." However, little transient effect is wrought on upstream pressure Po. This is because of the presence of the regulator RG.

To eliminate the external disturbance indicated in FIG. 16, it is desirable to install regulator $RG_1$ and regulator $RG_2$ on the two flow passages $S_1$ and $S_2$ as shown in FIG. 17. The regulator $RG_2$ could prevent the change in pressure from being felt on the upstream side when the flow passage $S_2$ is suddenly opened. The steady supply of the fluid in flow passage $S_1$ would not be affected. Conversely, the opening and closing of flow passage $S_1$ would have no affect on the side of flow passage $S_2$ In this connection, the regulator RG is a device to convert the high pressure fluid into low pressure fluid ready for supply to the downstream flow passage. However, the pressure changing device is itself expensive.

The number of regulators RG needed would increase with the number of flow passages. That would make the whole of the fluid supply arrangement complicated and large, sending up the costs.

In the fluid supply apparatuses shown in FIG. 14 and FIG. 15, only one kind of gas is supplied. In practice, however, a plurality of kinds of material gases G are led into the reaction chamber C, one by one or simultaneously, in semiconductor manufacturing facilities.

It is also noted that the mass flow controller is used at almost all semiconductor manufacturing facilities or chemical production plants where the flow rate is required to be controlled with high precision.

FIG. 18 shows an example of the high-purity moisture generating apparatus for use in semiconductor manufacturing facilities.

Three kinds of gases—$H_2$ gas, $O_2$ gas and $N_2$ gas—are led into a reactor RR through valves $V_{1a}$–$V_{3a}$ with the flow rate controlled by the mass flow controllers MFC1a–MFC3a. The reactor RR is first purged with $N_2$ gas with valve $V_{3a}$ opened and valves $V_{1a}$, $V_{2a}$ closed. In the next step, the valve $V_{3a}$ is closed and valves $V_{1a}$, are opened to feed $H_2$ gas and $O_2$ gas into the reactor RR. Here, $H_2$ gas and $O_2$ gas are reacted with platinum as catalyst to produce $H_2O$ gas. The high-purity moisture thus produced is then supplied to downstream facilities (not shown).

The problem is that each mass flow controller has its linearity corrected for a specific kind of gas and a specific low rate range. That is, the mass flow controller cannot be used for other than the kind of gas for which the controller is adjusted.

That is why the mass flow controllers MFC1a to MFC3a are installed for $H_2$ gas, $O_2$ gas and $N_2$ gas, respectively, i.e., one mass flow controller for one kind of gas, as shown in FIG. 18. In a gas supply arrangement as shown in FIG. 18, furthermore, each of the mass flow controllers MFC1a to MFC3a is provided with a standby.

The mass flow controller is expensive and so are replacement parts. That increases the costs of gas supply facilities and the running costs.

Furthermore, if the mass flow controller is not replaced for a new kind of gas and, instead, the linearity is corrected every time a new gas is used, it takes long and it could happen that the operation of the manufacturing plant has to be temporarily suspended. To avoid that, it is necessary to have standby mass flow controllers for different kinds of gases ready in stock.

As set forth above, in case the flow passage from one regulator for regulation of pressure branches off into a plurality of parallel lines and each branch line is provided with a mass flow controller for regulation of the flow rate, then the opening of a branch line can cause a transient change to the other branch flow passages running in a steady state flow. This transient change in turn has an affect on the process in the reaction chamber off the branch line, causing a number of problems.

If each branch line is provided with one regulator to avoid such transient changes, meanwhile, that will make the fluid supply arrangement complicated and bulky, boosting the costs.

Furthermore, a large number of expensive standby mass flow controllers have to be stocked. That increases the costs of gas supply facilities and the running costs.

The present invention addresses these problems with the prior art.

SUMMARY OF THE INVENTION

Accordingly, it is an object of the present invention to provide a parallel divided flow type fluid supply apparatus which comprises a regulator RG to regulate the pressure of fluid, a plurality of flow passages $S_1$, $S_2$ into which a flow of fluid from the regulator RG is divided in the form of parallel lines and mass flow controllers $DMFC_1$, to $DMFC_2$ for control of the flow rate, one controller installed on each flow passage, wherein the mass flow controller on a flow passage is so set that when the mass flow controller is actuated to open the passage for a steady flow state at a set flow rate, a delay time $\Delta t$ is allowed for the flow rate to rise from the starting point to the set flow rate value Qs.

It is another object of the present invention to provide a parallel divided flow type fluid supply apparatus wherein the delay time $\Delta t$ is adjustable.

It is still another object of the present invention to provide a parallel divided now type fluid supply apparatus which comprises a regulator RG to regulate the pressure of fluid, a plurality of flow passages $S_1$, $S_2$ into which a flow of fluid from the regulator RG is divided in the form of parallel lines and pressure-type flow control systems $FCS_1$, $FCS_2$ one system installed on each flow passage, the pressure-type flow control system comprising an orifice OR, a control valve CV installed upstream thereof, a pressure detector provided between the orifice and the control valve and a calculation control circuit CCC wherein with the pressure $P_1$ on the upstream side of the orifice set at twice or more higher than the pressure $P_2$ on the downstream side, the flow rate is calculated as $Qc=KP_1$(K=constant) from the pressure $P_1$ detected by the pressure detector and the difference between the calculated flow rate Qc and the set flow rate Qs is outputted as control signal Qy to the drive DV of the control valve and wherein the flow rate downstream of the orifice is regulated by actuating the control valve.

It is a further object of the present invention to provide a fluid-switchable pressure-type flow control method by flow factor which comprises calculating the flow rate Qc of the gas passing through the orifice according to the formula $Qc=KP_1$(K=constant) with the pressure $P_1$ on the upstream side of the orifice set at twice or more higher than the pressure $P_2$ on the downstream side, wherein the flow factor FF for each kind of gas is calculated as follows:

$$FF=(k/\gamma s)\{2/(\kappa+1)\}^{1/(\kappa-1)}[\kappa/\{(\kappa+1)R\}]^{1/2}$$

wherein:
$\gamma s$=concentration of gas in standard state
$\kappa$=ratio of specific heat of gas
R=constant of gas
k=proportional constant not depending on the type of gas
and wherein if the calculated flow rate of gas type A is $Q_A$, when gas type B is allowed to flow through the same orifice under the same pressure on the upstream side and at the same temperature on the upstream side, the low rate $Q_B$ is calculated as follows:

$$Q_B=(FF_B/FF_A)Q_A$$

wherein:
$FF_A$=flow factor of gas type A
$FF_B$=flow factor of gas type B

It is a still further object of the present invention to provide a flow factor-based fluid-switchable pressure-type flow control system which comprises a control valve, an orifice, a pressure detector to detect the upstream pressure therebetween and a flow rate setting circuit, wherein with the pressure $P_1$ on the upstream side held to be about twice or higher than the downstream pressure $P_2$, the flow rate Qc of a specific gas type A can be calculated according to the formula $Qc=KP_1$ (K=constant), wherein the control valve is controlled to open or close on the basis of the difference signal between the calculated flow rate Qc and the set flow rate Qs, characterized in that there is provided storage means for storing the flow factor ratio of gas type A to gas type B ($FF_B/FF_A$) which is calculated for each kind of gas as follows:

$$FF=(k/\gamma s)\{2/(\kappa+1)\}^{1/(\kappa-1)}[\kappa/\{(\kappa+1)R\}]^{1/2}$$

Wherein:
$\gamma s$ concentration of gas in standard stale
$\kappa$=ratio of specific heat of gas
R=constant of gas
k=proportional constant not depending on the type of gas
and that there is provided calculation means in which in case the calculated flow rate of gas type A as reference is $Q_A$, and when gas type B is allowed to flow through the same orifice under the same pressure on the upstream side and at the same temperature on the upstream side, the flow rate $Q_B$ is calculated as follows:

$$Q_B = (FF_B/FF_A)Q_A$$

It is still another object of the present invention to provide a parallel divided flow type fluid supply apparatus wherein the pressure-type flow control system to be installed in any of the flow passages is the flow factor-based fluid-switchable pressure-type flow control system described above.

After extensive study of the working characteristics of the mass flow controller in FIG. 15 and FIG. 16, the inventors found that if the mass flow controller is opened quickly up to the set flow rate level, a large quantity of material gas suddenly flows into flow passage $S_2$. As a result, the pressure $P_1A$ in flow passage $S_1$ drops transiently and causes the signal $MFC_1$ and signal $MFM_1$ to undergo a transient change.

To minimize the reflective, transient effect on flow passage $S_1$ of flow passage $S_2$, it is important to let the gas flow into flow passage $S_2$ gradually. That is, after the valves $V_3$, $V_4$ are opened, mass flow controller $MFC_2$ should be so controlled that the flow rate is raised from "0" to the set flow rate level in a predetermined time.

That time is called delay time $\Delta t$. The longer the delay time $\Delta t$ is, the less the transient effect becomes. If this delay time $\Delta t$ can be freely changed, it is possible to cope with transient changes under various conditions.

The delay time $\Delta t$ depends on the size of the set flow rate value $Qs$, pipe diameter, type of fluids such gas. It is desirable that the delay time $\Delta t$ is determined empirically under various conditions.

The effect on flow passage $S_1$ of flow passage $S_2$ has been described. Conversely, the effect on flow passage $S_2$ of flow passage $S_1$ can be considered the same way. In case the number of flow passages are more than two, the transient effect can be treated the same way.

In case there are a plurality of flow passages and if all the mass flow controllers are to be subjected to time delay control, that can minimize the transient effect of the opening of any flow passage on other flow passages.

Thinking that the mass flow controller had unique characteristics that made it difficult to absorb the transient effect, the inventors also intensively sought some other method not using the mass flow controller.

As a result, the inventors concluded that the mass flow controller cannot absorb the transient effect very well because the controller measures the flow rate on the basis of the amount of heat transfer or heat carried by the fluid, and if the change in flow rate is higher than the flow velocity, the control of the flow rate cannot follow the change in flow rate well.

Thinking that the problem could be solved by using a pressure-type flow control system that could quickly follow the change in flow rate, the inventors decided to adopt the pressure-type flow control system the inventors developed earlier and disclosed under Unexamined Japanese Patent Application No. 8-338546.

This pressure-type flow control system works on the following principle. When the pressure $P_1$ on the upstream side of the orifice is about twice as high as the pressure $P_2$ on the downstream side of the orifice, the velocity of the flow through the orifice reaches the sonic velocity, then the flow rate $Qc$ of the flow passing through the orifice is proportional to the pressure $P_1$ on the upstream side of the orifice. That is given in the equation $Qc=KP_1$ (K: constant) In other words, it the pressure $P_1$ on the upstream side alone is known, the flow rate can be immediately worked out. While the mass flow controller determines the flow rate on the basis of heat transfer, the pressure-type flow control system is based on the theoretical properties of fluid. The pressure can thus be measured quickly.

If with a control valve installed on the upstream side of the orifice, the flow rate $Qc$ is worked out by equation $Qc=KP_1$ and then the control valve is controlled to open or close to bring the difference from the set flow rate $Qs$ to zero, the calculated flow rate $Qc$ can be immediately adjusted to the set flow rate $Qs$. That is made possible by the rapidity with which the pressure $P_1$ on the upstream side of the orifice can be measured. This arrangement can well absorb such changes as shown in FIG. 16.

While working toward development of a fluid supply apparatus using the pressure-type flow control system, furthermore, the inventors hit on a method that allows control of the flow rate without changing the basic setups for a plurality of kinds of gases by using a pressure-type flow control system in place of the traditional mass flow controller.

The pressure-type flow control system (FCS apparatus) the inventors developed earlier is to control the flow rate of the fluid with the pressure $P_1$ on the upstream side of the orifice held at about twice or more higher than the pressure $P_2$ on the downstream side. This FCS apparatus comprises an orifice, a control valve provided on the upstream side of the orifice, a pressure detector provided between the control valve and the orifice and a calculation control unit in which from the pressure $P_1$ detected by the pressure detector, the flow rate $Qc$ is calculated by equation $Qc=KP_1$ (K: constant) and the difference between the set now rate signal $Qs$ and the now rate signal $Qc$ is outputted as control signal $Qy$ to the drive of the control valve, characterized in that the pressure $P_1$ on the upstream side of the orifice is regulated by opening or closing the control valve to control the flow rate on the downstream side of the orifice.

The most significant feature of the FCS apparatus is that the flow rate $Qc$ of the gas flowing through the orifice depends only on the pressure $P_1$ on the upstream side of the orifice and can be worked out by the equation $Qc=KP_1$ (K: constant) for one orifice and one gas type.

In other words, if the orifice and gas type are selected and the proportional constant K is set, then the actual flow rate can be calculated with merely the measurement of the $P_1$ on the upstream side of the orifice regardless of changes in the pressure $P_2$ on the downstream side of the orifice. It is the subject of the present invention to determine how the flow rate can be worked out in case the gas type is changed and the pressure found on the upstream side is $P_1$ under the above-mentioned set conditions.

To solve this problem, the meaning of constant K has to be clarified.

First, let it be assumed that a gas flows out through an orifice from the high pressure region to the low pressure region. The law of continuity, law of energy conservation and law of gas state (inviscidity of gas) are applied to the flow pipe. Also, it is presupposed that adiabatic change takes place when a gas flows out.

Further, let it be assumed that the flow velocity of gas flowing out of the orifice reaches the sonic velocity at that gas temperature. The conditions for the sonic velocity to be reached are that $P_1 \geq$ about $2P_2$. In other words, the pressure ratio of $P_2/P_1$ should not be higher than the critical pressure ratio of about 1/2.

The flow rate Q at the orifice under those conditions is obtained as follows:

$$Q=SP_1/\gamma s\{2/(\kappa+1)\}^{1/(\kappa-1)}\{2g/(RT_1)\cdot\kappa/(\kappa+1)\}^{1/2}$$

This flow rate Q can be solved as follows:

$$Q=FF\cdot SP_1(1/T_1)^{1/2}$$

$$FF=(k/\gamma s)\{2/(\kappa+1)\}^{1/(\kappa-1)}[\kappa/\{(\kappa+1)R\}]^{1/2}$$

$$k=(2\times 9.81)^{1/2}=4.429$$

The physical quantities including the units are as follows: Q (m³/sec) volumetric flow rate in standard state; S (m²) sectional area of the orifice; $P_1$ (kg/m² abs)=absolute pressure on the upstream side; $T_1$ (K)=gas temperature on the upstream side; FF (m³K$^{1/2}$/kg sec)=flow factor; k: proportional constant; γs (kg/m³)=concentration of gas in standard state; κ(dimensionless)=specific heat ratio of gas; R(m/K)= gas constant.

Therefore, if it is assumed that the calculated flow rate Qc (=$KP_1$) is equal to the aforesaid flow rate Q, the constant K is given as K=FF·S/$T_1^{1/2}$. It shows that the constant K depends on the gas type, gas temperature on the upstream side and sectional area of the orifice. From this, it is evident that the calculated flow rate Qc depends on only flow factor FF under the same conditions, that is, the same pressure $P_1$ on the upstream side, the same temperature on the upstream side and the same sectional area of the orifice.

Flow factor FF, which depends on concentration γs in standard state, specific heat ratio κ and gas constant R, is a factor determined by the gas type only. That is, in case where the calculated flow rate of gas type A is $Q_A$, gas type B flows under the same pressure $P_1$ on the upstream side, at the same temperature $T_1$ on the upstream side through the same orifice sectional area, the calculated flow rate $Q_B$ is given as $Q_B=(FF_B/FF_A)Q_A$ where $FF_A$ is the flow factor of gas type A and $FF_B$ is flow factor of gas type B.

In other words, if the conditions are identical except for the gas type, the flow rate $Q_B$ for another gas can be worked out merely by multiplying the flow rate $Q_A$ by the flow factor ratio of $FF_B/FF_A$ (FF ratio). Any gas type can be the reference gas type A. In the present invention, $N_2$ is used as a basis as is common practice. That is, the FF ratio is FF/$FF_N$. $FF_N$ is the flow factor FF of $N_2$ gas. The physical properties and flow factors of different gases are shown in Table 1.

In calculation of FF ratios, the proportional constant K is eliminated by abbreviation. In calculating FF, therefore, the constant k may be any value. To give k as 1 (k=1) would simplify the calculation. Therefore, the proportional constant k in the respective claims is the higher in arbitrariness.

The authenticity of the aforesaid theory was confirmed in the following procedure. The first step is to flow $N_2$ gas to initialize the FCS apparatus and confirm that the linearity of Qc=$KP_1$ is established under the conditions $P_1 \geq 2P_2$. The next step is to flow $O_2$ gas and set the $P_1$ on the upstream side of the orifice and at the temperature $T_1$ on the upstream side using the same orifice. $O_2$ gas flow rate $Q_{O2}$ is worked out using the equation Q=FF ratio×$Q_N$, that is, multiplying the $N_2$ gas flow rate $Q_N$ by the FF ratio of $O_2$=0.9349. Meanwhile, the $O_2$ gas flow rate is compared with the value measured by build up method. It was confirmed that the error was within 1 percent. This shows that the aforesaid theory is correct.

TABLE 1

Physical properties and flow factors of different gases

| Gas type | γs (kg/m³) | κ (dimensionless) | R (m/K) | F.F. (m³ K$^{1/2}$/ kg sec) | F.F. ratio (dimensionless) |
|---|---|---|---|---|---|
| $N_2$ | 1.25050 | 1.400 | 30.28 | 0.31167 | 1.0000 |
| He | 0.17850 | 1.660 | 211.80 | 0.87439 | 2.8055 |
| Ar | 1.78340 | 1.660 | 21.22 | 0.27649 | 0.8871 |
| $O_2$ | 1.42895 | 1.397 | 26.49 | 0.29239 | 0.9349 |
| $CO_2$ | 1.97680 | 1.301 | 19.27 | 0.24090 | 0.7730 |
| $H_2$ | 0.08987 | 1.409 | 420.62 | 1.16615 | 3.7416 |
| CO | 1.25000 | 1.400 | 30.29 | 0.31174 | 1.0002 |
| NO | 1.34020 | 1.384 | 28.27 | 0.29978 | 0.9618 |
| $N_2O$ | 1.98780 | 1.285 | 19.27 | 0.23853 | 0.7653 |
| HCl | 1.63910 | 1.400 | 23.25 | 0.27136 | 0.8707 |
| $NH_3$ | 0.77130 | 1.312 | 40.79 | 0.38525 | 1.2361 |

As mentioned above, the flow rate Q of any gas can be calculated from the flow rate $Q_N$ of $N_2$ gas by the equation Q=FF ratio×$Q_N$.

While the equation $Q_N=KP_1$ is established, the $P_1$ on the upstream side is proportional to the opening degree of the control valve. With the $N_2$ gas flow rate for an opening degree of 100 percent as $Q_{N100}$, the $N_2$ gas flow rate $Q_N$ for a certain opening degree is given as $Q_N=Q_{N100}\times$(opening degree/100). Therefore, the flow rate Q of a gas type can be worked out as Q=FF ratio×$Q_{n100}$×(opening degree/100). The FF ratio in this case is FF/FF.

This formula for calculation of the flow rate is useful in finding the actual flow rate Q of gas from the opening degree of the control valve. But it is clear that the formula is identical with the aforesaid equation Q=FF ratio×$Q_N$.

Additional objects, features and advantages of the present invention will become apparent from the Detailed Description of Preferred Embodiments, which follows, when considered together with the attached figures.

DESCRIPTION OF THE PREFERRED EMBODIMENTS

EXAMPLE 1

Time Delay Type Mass Flow Controller

Figure 1:
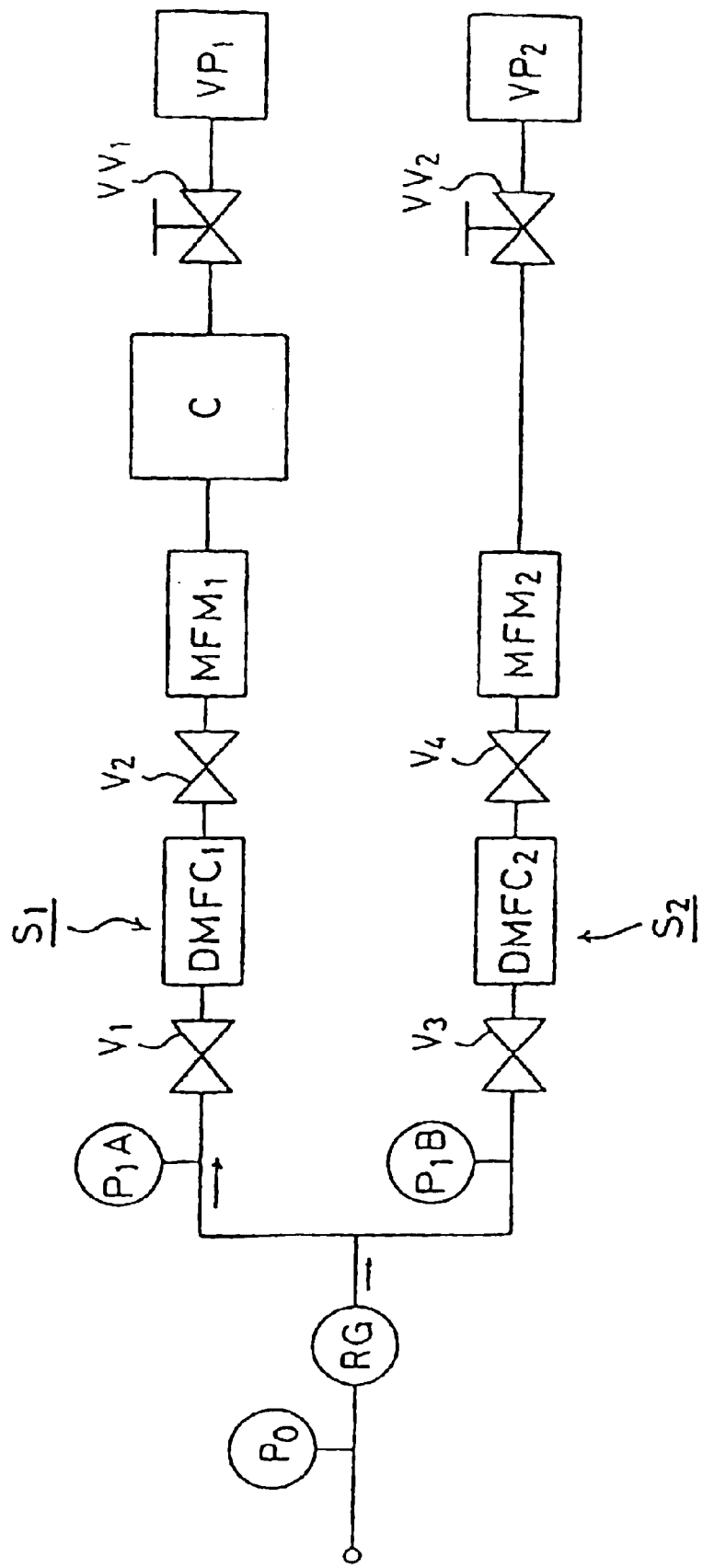
FIG. 1 is a schematic diagram of an embodiment of the parallel divided flow type fluid supply apparatus using the time delay-type mass flow controller according to one embodiment of the present invention.
Figure 15:
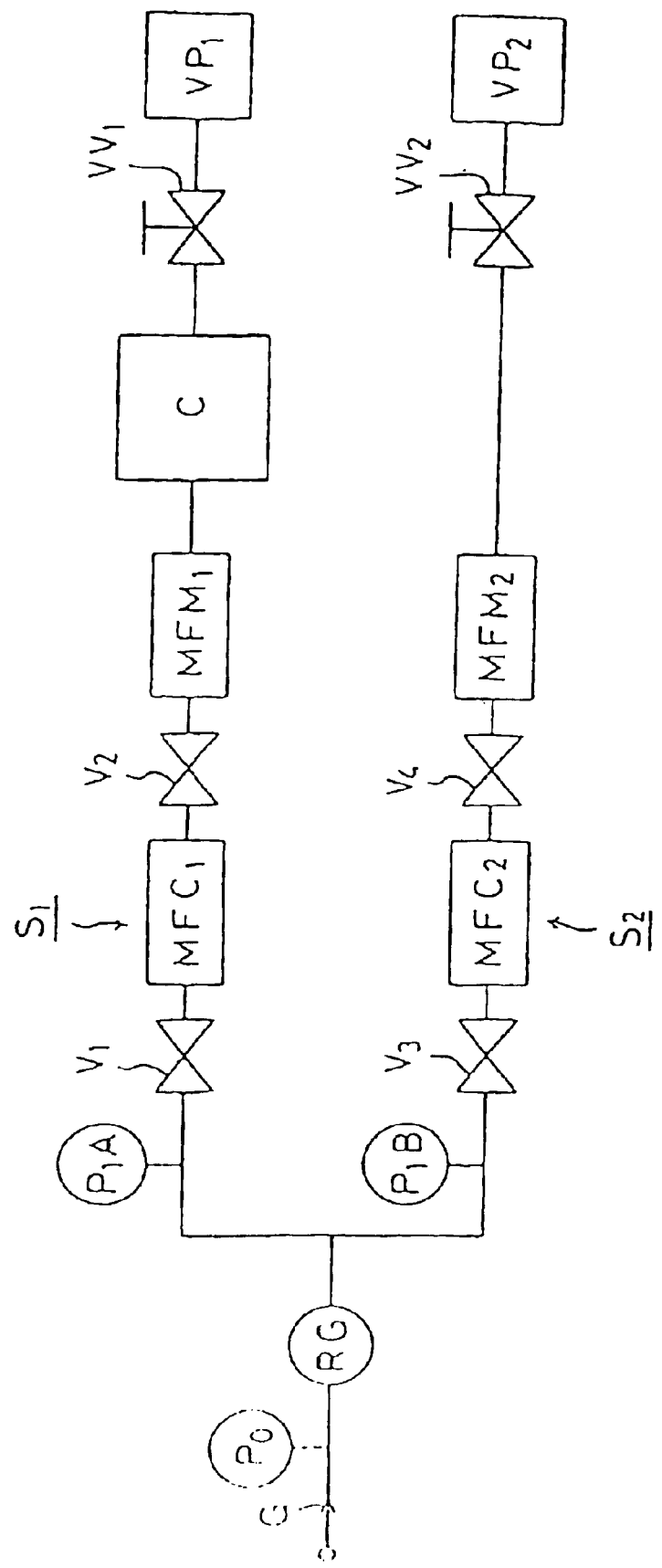
FIG. 15 is a schematic diagram of the prior art two flow passage fluid supply apparatus.
Figure 16:
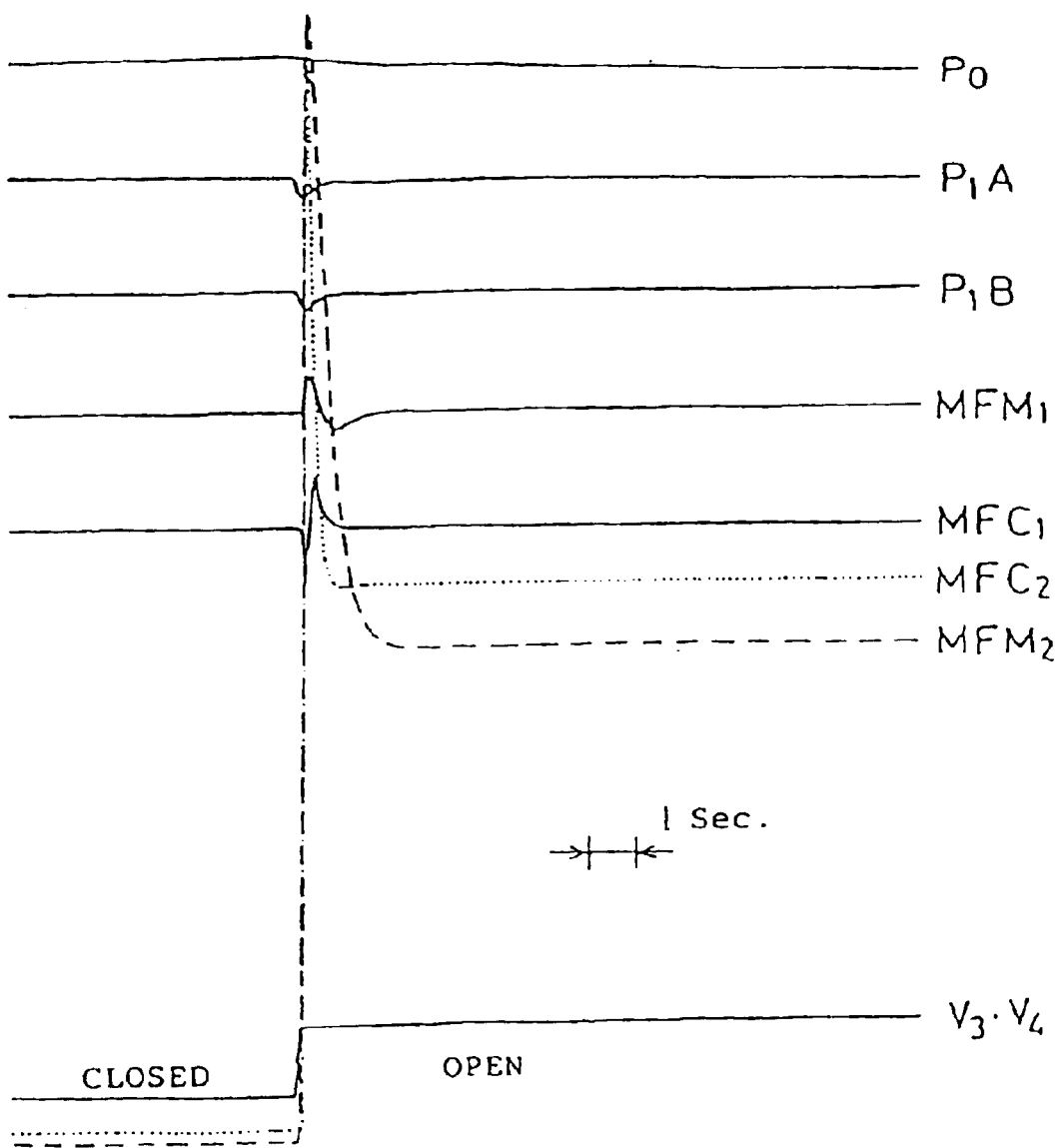
FIG. 16 is a time chart of various signals in the apparatus or FIG. 15.
Figure 17:
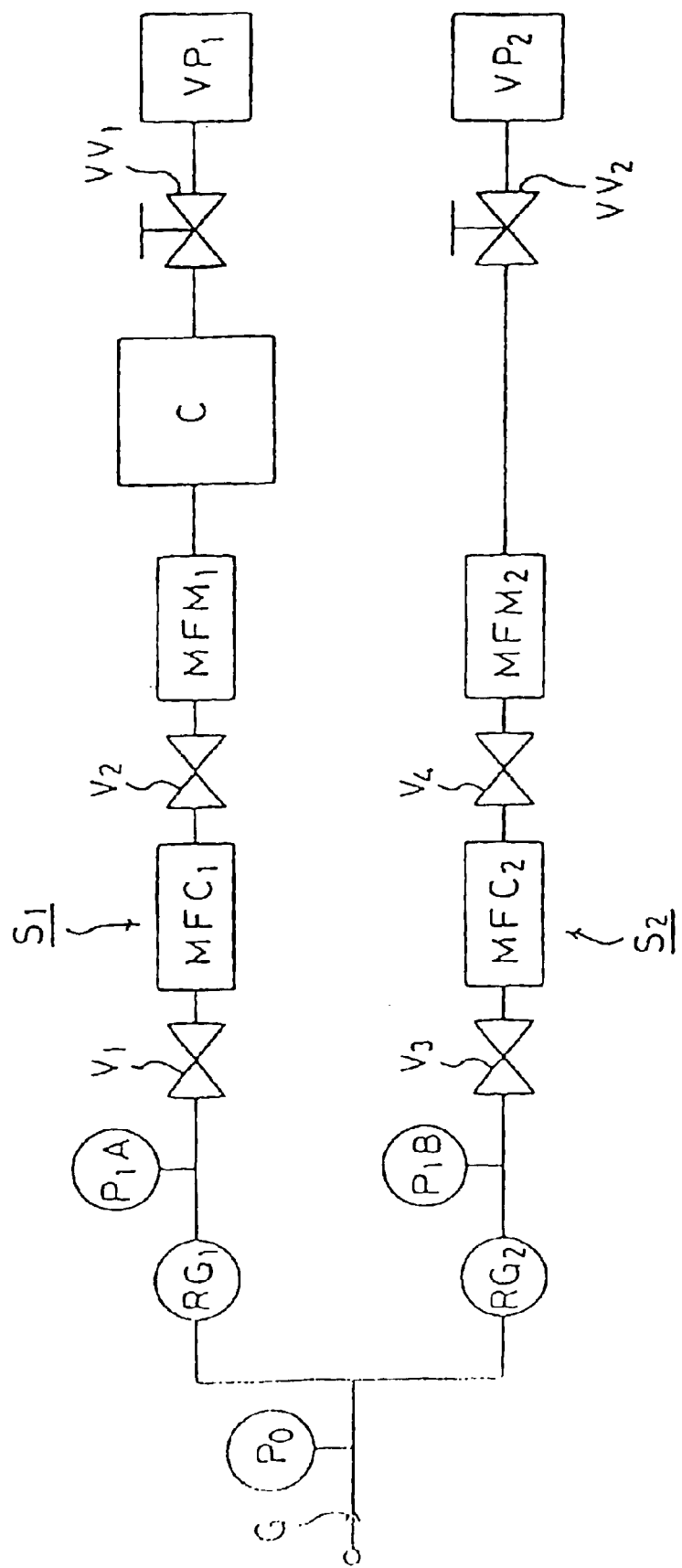
FIG. 17 is another schematic diagram of the prior art two flow passage type fluid supply apparatus.

FIG. 1 is a schematic diagram of an embodiment of the parallel divided flow type fluid supply apparatus using the time delay-type mass flow controller according to the present invention. In FIG. 1, Po indicates a pressure gauge for measurement of supply pressure; $P_1A$, $P_1B$, pressure gauges for measurement of primary pressure $V_1$ to $V_4$ valves; $DMFC_1$, $DMFC_2$, time delay-type mass flow controllers for control of flow rate; $MFM_1$, $MFM_2$, mass flow meters for measurement of flow rate; C, a reaction chamber; $VV_1$, $VV_2$, valves; $VP_1$, $VP_2$, vacuum pumps; and $S_1$, $S_2$, flow passages. The arrows indicate the direction of flow. Those components are given different suffixes on different flow passages. FIG. 1 is identical with FIG. 15 in arrangement.

Figure 2:
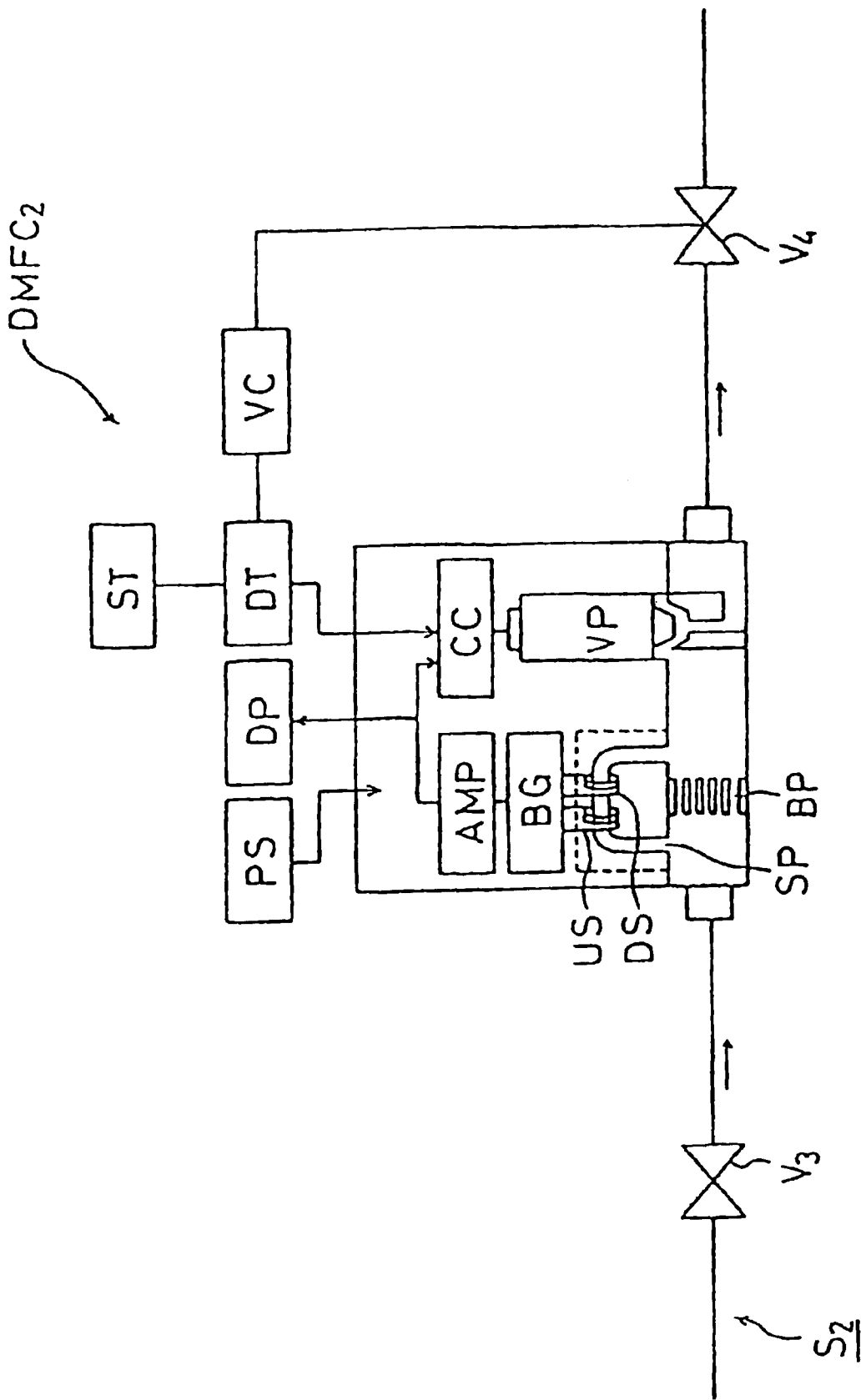
FIG. 2 is a concrete schematic diagram of the time delay-type mass flow controller in FIG. 1.

FIG. 2 is a schematic diagram of the same time delay-type mass flow controller as in flow passage $S_2$. In the figure, VC indicates a valve detector to detect the close-to-open operation of valves $V_3$, $V_4$; ST, a flow rate setter; DT, time delay unit; PS, power source; DP, display; AMP, amplifier; BG, bridge circuit; CC, comparison circuit; and VP, valve unit. Further, BP designates bypass; SP, sensor; US, sensor on the upstream side; and DS, sensor on the downstream side.

The operation of the time delay type mass flow controller of FIG. 1 will now be explained.

Let it be assumed that the gas is flowing in flow passage $S_1$ on a steady basis with valve $V_1$ and valve $V_2$ kept open and with a stable gas reaction taking place in the reaction chamber C. Then, valve $V_3$ and valve $V_4$ are opened to allow the gas to flow into time delay-type mass flow controller $DMFC_2$.

Initially, the valve unit VP is fully closed. When the valve detector VC detects that valve $V_3$ and valve $V_4$ turn from close to open positions, the delay time unit DT begins to work after short time $t_0$. This short stop time $t_0$, which may be zero, is allowed as time to settle the turbulence of the gas flow following the opening of valve $V_3$ and valve $V_4$.

The time delay unit DT allows delay time $\Delta t$. This is the time for the valve unit VP to gradually open to the flow rate Qs set by the flow rate setter ST. This delay time $\Delta t$ is for the valve unit VP to open slowly so as to minimize the affect on other flow passages. Thus, the turbulence can be kept down by allowing short stop time $t_0$ and delay time $\Delta t$. The time to settle the initial turbulence can be properly adjusted by making those times $t_0$ and $\Delta t$ variable.

In the present example, valve $V_3$ and valve $V_4$ are opened simultaneously and the short stop time $t_0$ is set relatively long at 2 to 3 seconds. If the short stop time $t_0$ is set at zero or not longer than 0.5 seconds, the time difference in opening (or closing) time between valve $V_3$ and valve $V_4$ is a great factor in determining the affect on the other flow passage $S_1$.

In case the short stop time $t_0$ is very short, therefore, flow passage $S_2$ is opened this way. That is, valve $V_4$ is first opened and some one second later valve $V_3$ is opened. In closing the flow passage $S_2$, valve $V_3$ is first closed. Then, valve $V_4$ is closed some one second later. That is, it is desirable to take care not to apply large fluid pressure on the mass now controller $DMFC_2$ on the now passage $S_2$ side.

The gas flow is divided into bypass section BP and sensor section SP. In the sensor section SP, the heat generated by the sensor US on the upstream side is detected by sensor DS on the downstream side, and the instantaneous flow rate Q is calculated by bridge circuit BG. After passing through amplifier AMP, the instantaneous flow rate Q is compared with the set flow rate Qs in comparison circuit CC. The valve unit VP is opened in the aforesaid delay time $\Delta t$. When the set flow Qs is reached, the valve unit VP is maintained in that position.

FIG. 3 to FIG. 6 show time charts of various signals with different delay times $\Delta t$. In those examples of measurements, delay time $\Delta t$ is defined as the time required for the set flow rate to reach 80 percent, that is, the time it takes for the instantaneous flow rate Q to rise up to 80 percent of the set flow rate Qs. Delay time $\Delta t$ is defined in many other ways. It is understood that those other definitions of delay time fall within the scope of the present invention.

Figure 3:
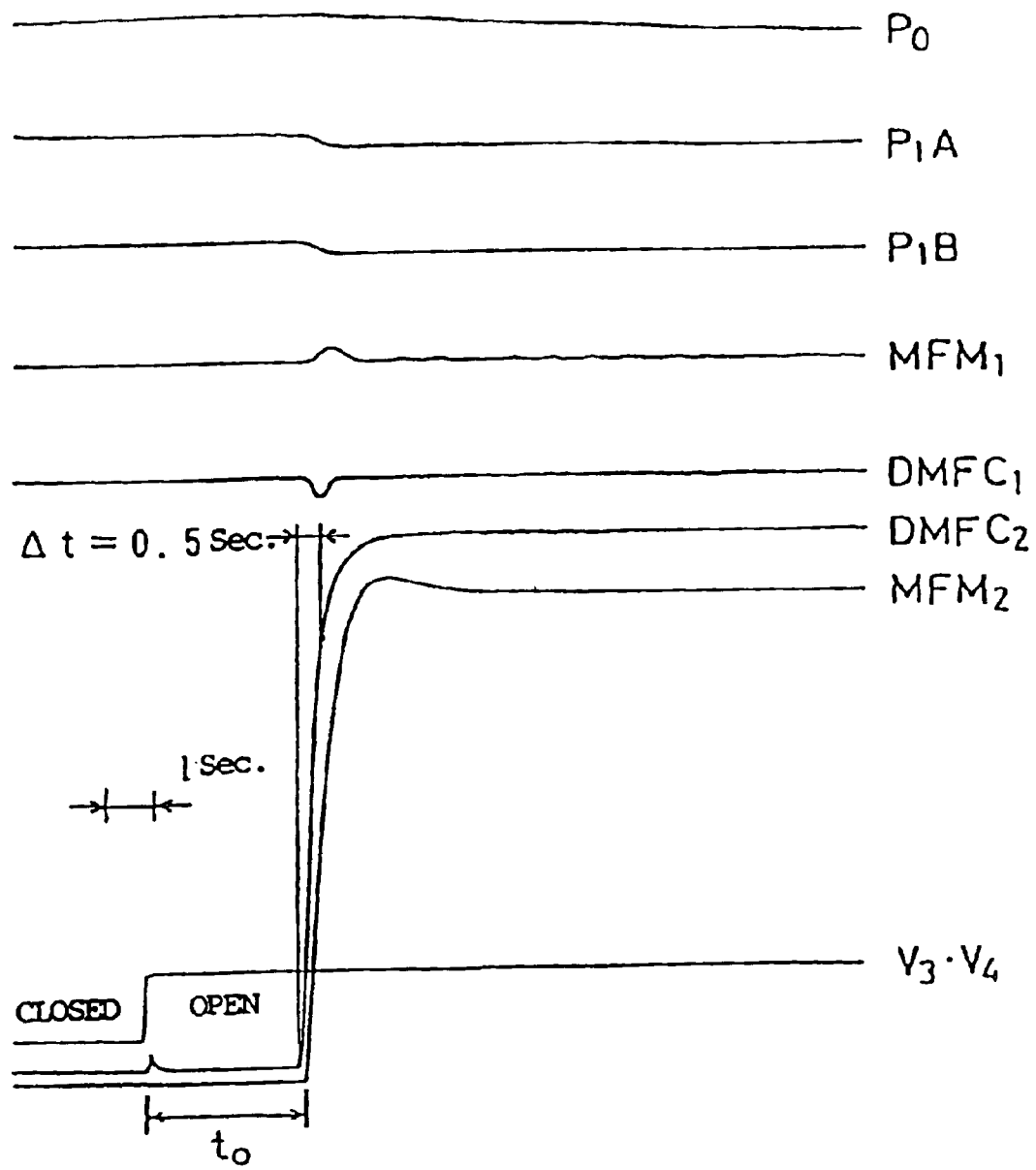
FIG. 3 is a time chart of various signals in the apparatus of FIG. 1 with a delay time Δt of 0.5 second.
Figure 4:
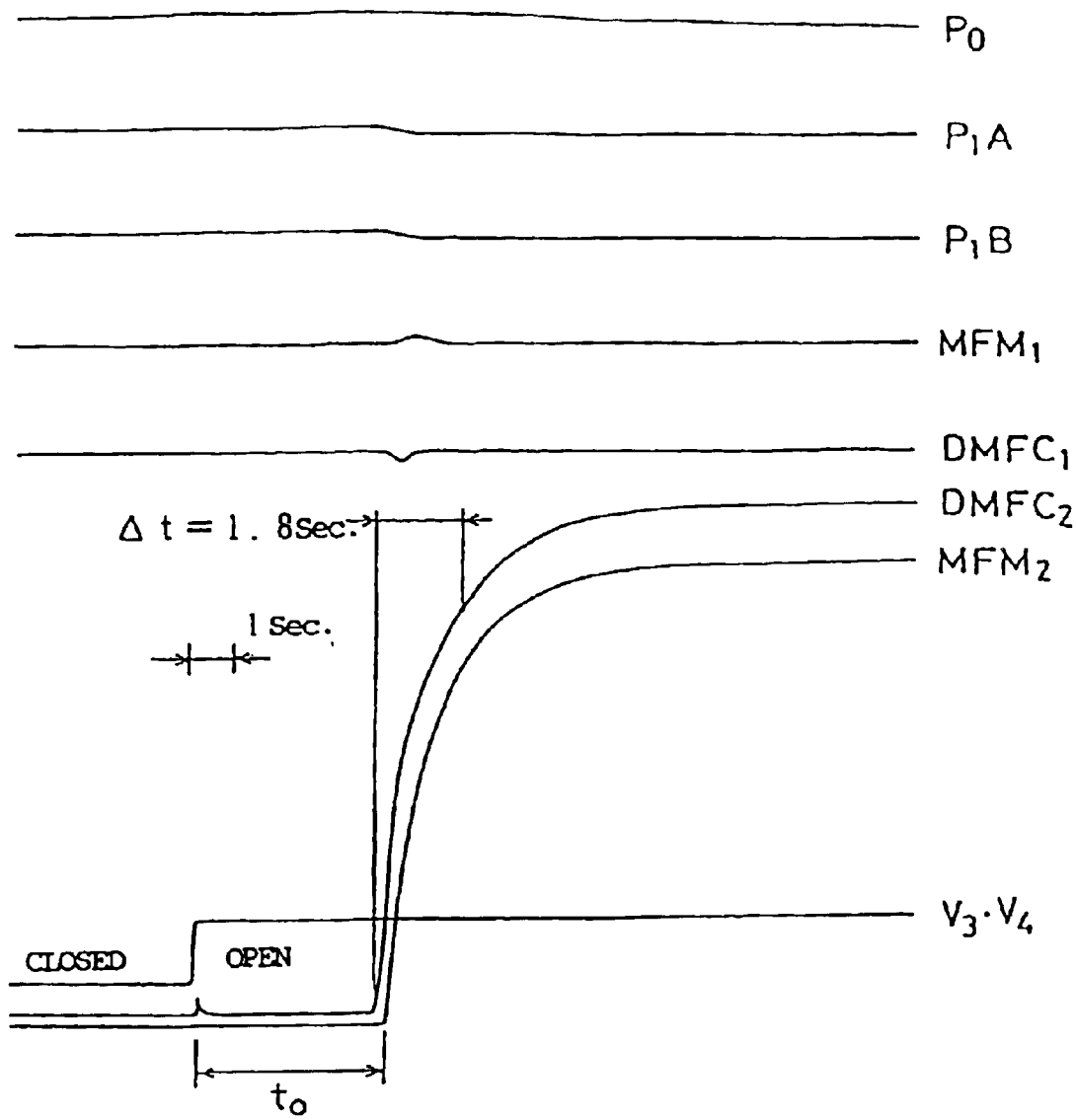
FIG. 4 is a time chart of various signals in the apparatus of FIG. 1 with a delay time Δt of 1 second.
Figure 5:
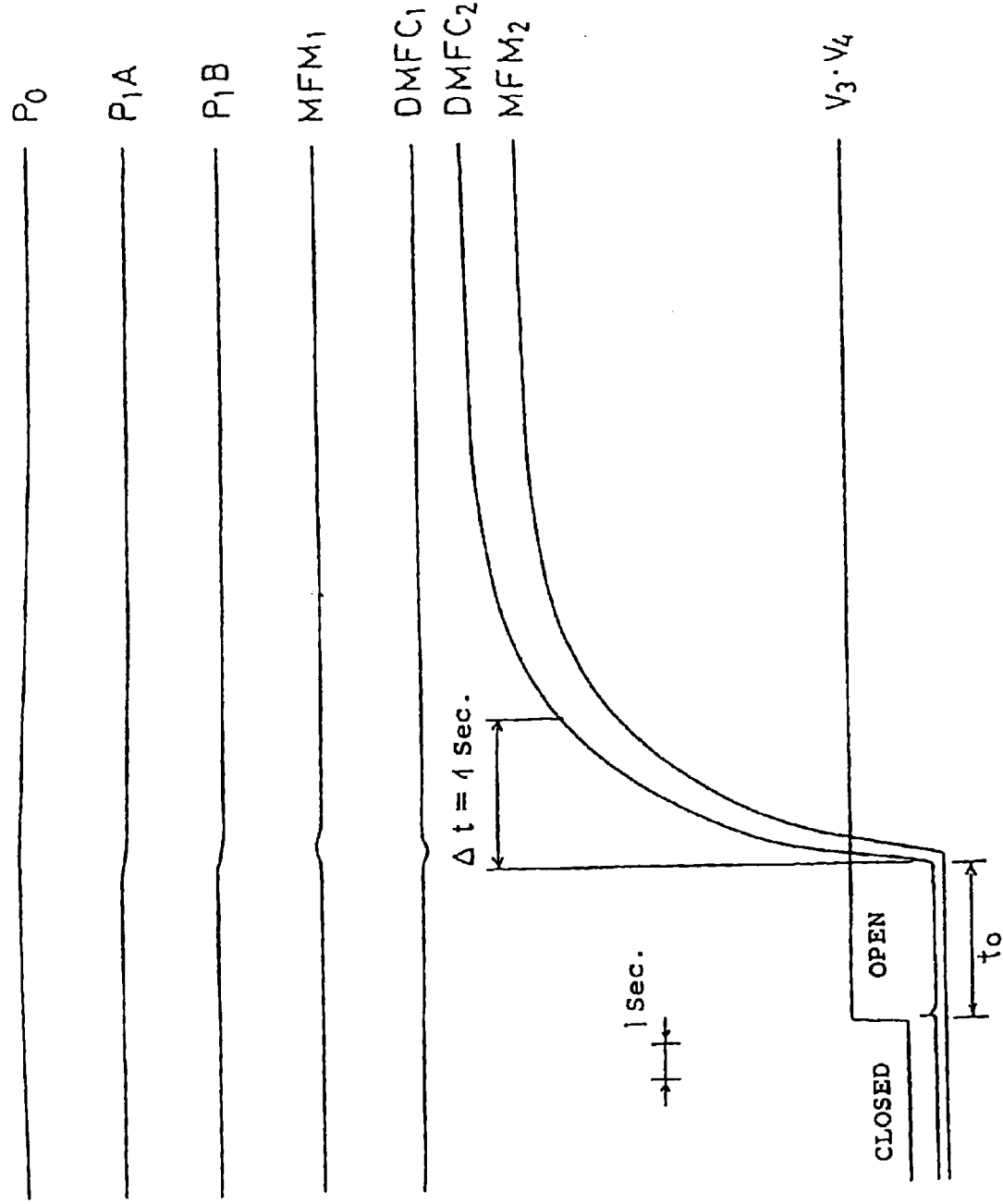
FIG. 5 is a time chart of various signals in the apparatus of FIG. 1 with a delay time Δt of 4 seconds.
Figure 6:
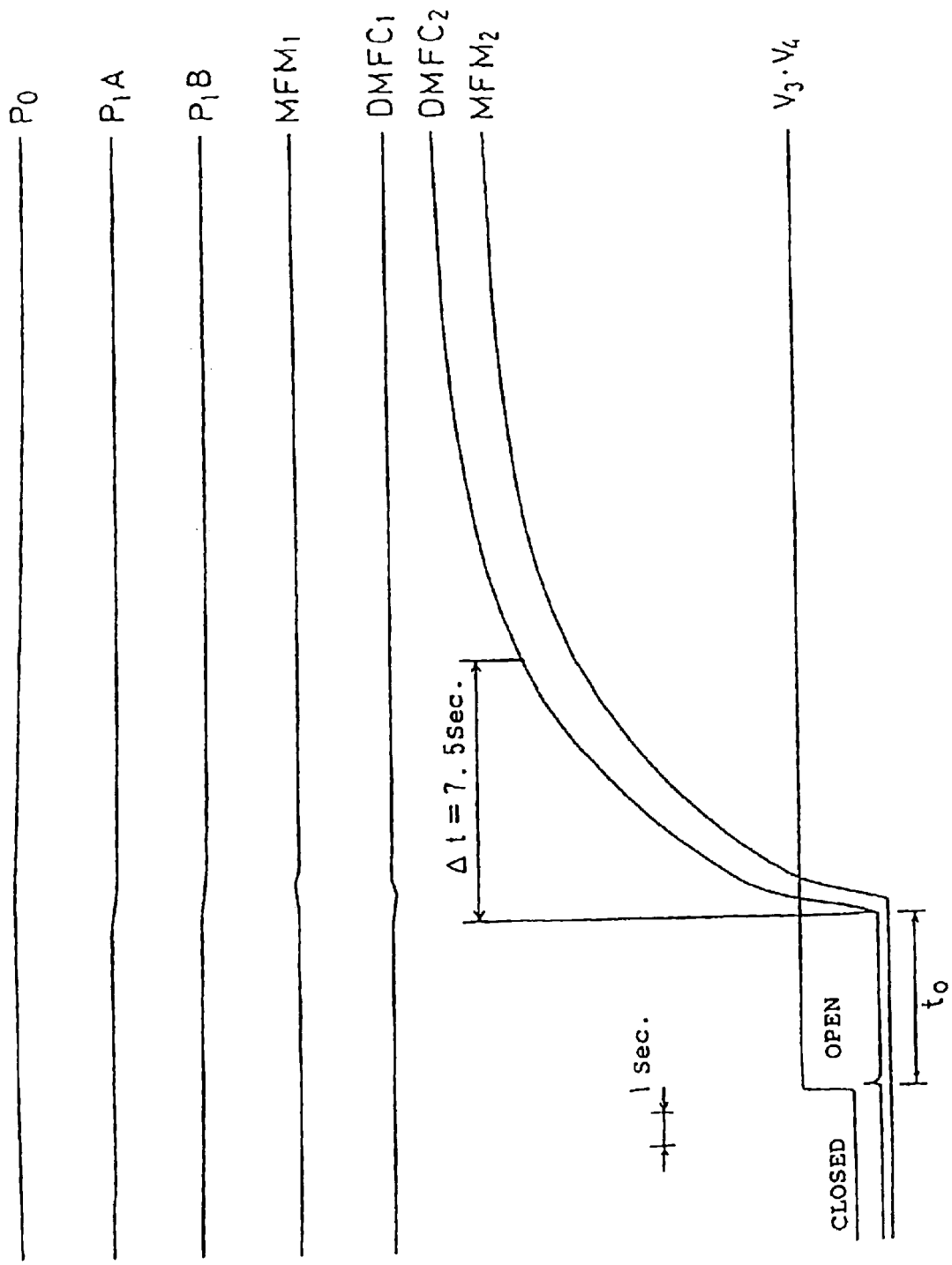
FIG. 6 is a time chart of various signals in the apparatus of FIG. 1 with a delay time Δt of 7.5 seconds.

Different drawings show time charts with different delay times $\Delta t$: FIG. 3, delay time $\Delta t=0.5$ seconds; FIG. 4, delay time $\Delta t=1.8$ seconds; FIG. 5, delay time $\Delta t=4$ seconds: FIG. 6, delay time $\Delta t=7.5$ seconds. The short stop time $t_0$ can be set freely. In FIG. 3 to FIG. 6, it is set at 3 to 5 seconds. The short stop time $t_0$ may be still shorter.

Figure 12:
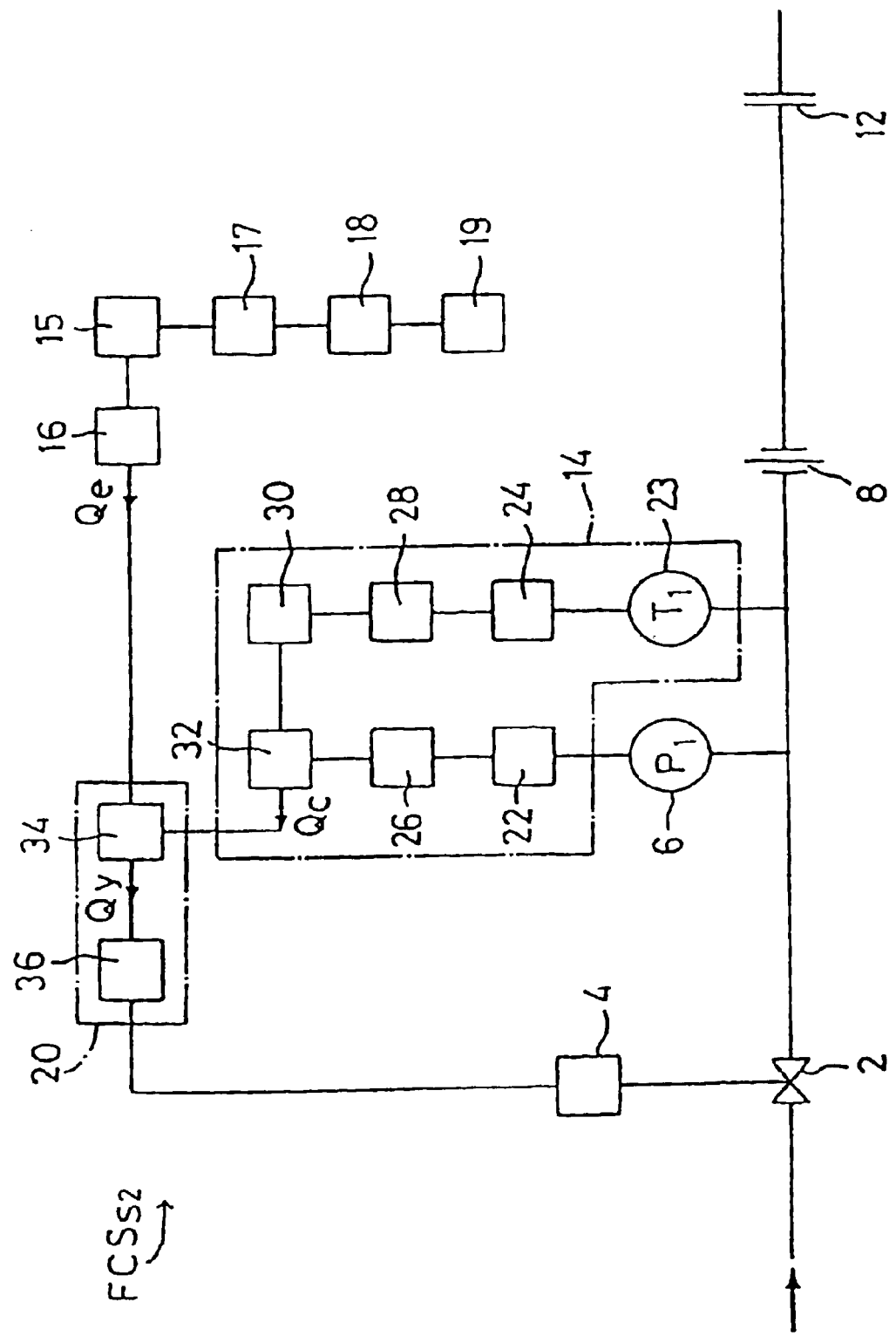
FIG. 12 is a block diagram of a fluid switchable pressure-type flow control system (FCS) according to a still further embodiment of the present invention.

Signals shown in FIG. 3 to FIG. 6 were measured under the same conditions as those in FIG. 12 except that the time delay type mass flow controllers $DMFC_1$, $DMFC_2$, were used instead of mass flow controllers $MFC_1$, $MFC_2$. A comparison of those time charts show that as the delay time $\Delta t$ gels longer, the transient effects on the respective signals fall further. That demonstrates that the sharp drop in transient changes of signals $P_2A$, $DMFC_1$ and $MFM_1$ especially on now passage $S_1$ well achieves the object of the present invention—the object to minimize the effect on flow passage $S_1$ of the opening of flow passage $S_2$.

EXAMPLE 2

Pressure Type Flow Controller

Figure 7:
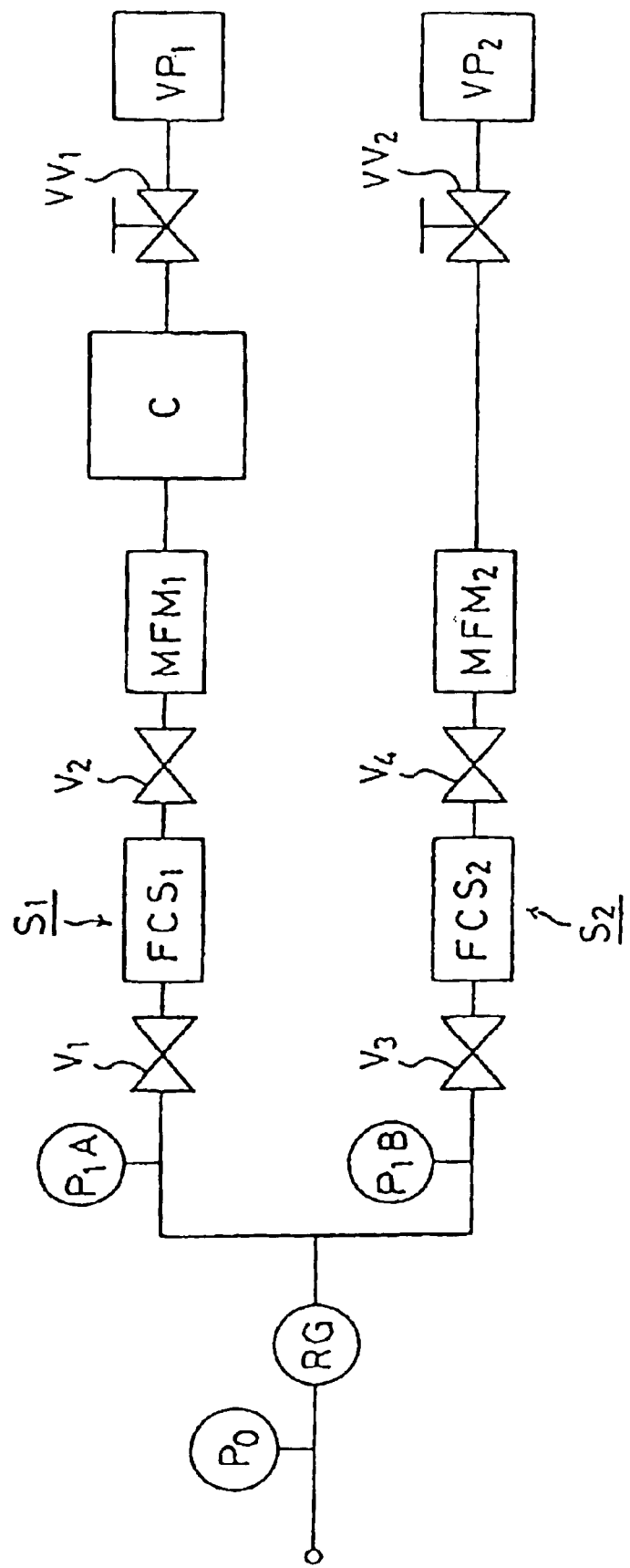
FIG. 7 is a schematic diagram of an embodiment of the parallel divided flow type fluid supply apparatus according to another embodiment of the present invention using the pressure-type flow control systems.

FIG. 7 is a schematic diagram of an embodiment of the parallel divided flow type fluid supply apparatus according to a further embodiment of the present invention in which pressure-type flow control systems are used. FIG. 7 is identical with FIG. 1 in arrangement except that pressure-type flow control systems $FCS_1$, $FCS_2$ are used in place of time delay type mass flow controllers $DMFC_1$, $DMFC_2$. No description of like components will be repeated.

Figure 8:
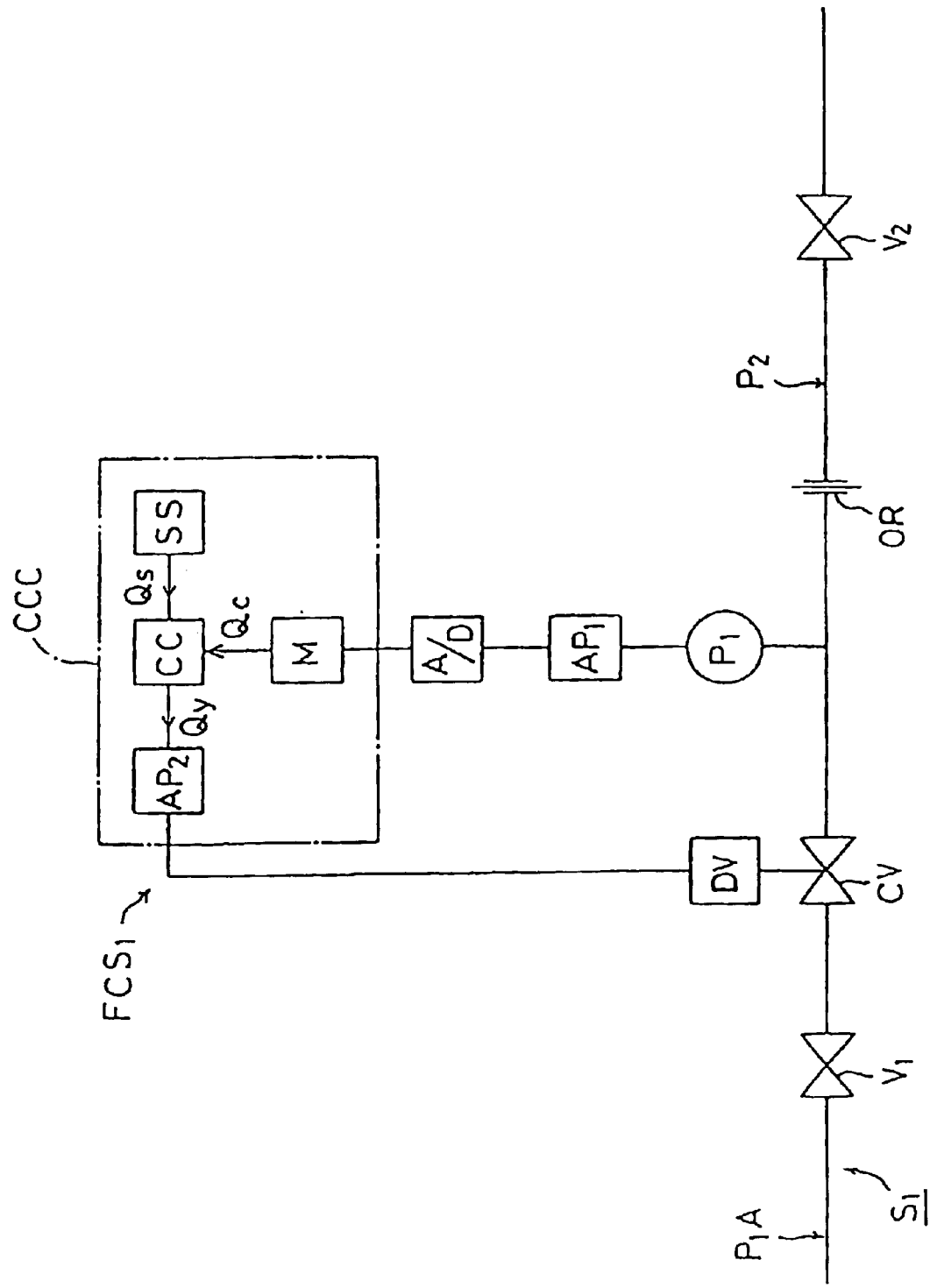
FIG. 8 is a concrete schematic diagram of the pressure-type flow control system in FIG. 7.

FIG. 8 is a schematic diagram of the pressure-type flow control system $FCS_1$ in flow passage $S_1$. The same is provided in flow passage $S_2$. Referring to FIG. 8, OR indicates orifice; $P_1$, pressure gauge on the upstream side of the orifice; $AP_1$, amplifier; is A/D, A-D converter; M, temperature compensator; SS, flow rate setter; CC, comparison circuit; $AP_2$, amplifier; DV, drive; and CV, control valve. It is also understood that SS, CC, M and $AP_2$ as a whole are called calculation control circuit CCC.

The operation of the embodiment of FIG. 7 will now be explained. Let it be assumed that a closed now passage $S_2$ is suddenly opened, and its pressure change causes a reverse flow in flow passage $S_1$. It has been theoretically proven that the instantaneous flow rate Q passing through the orifice OR is given in the equation Q $KP_1$(K: constant) in the pressure-type flow control system FCS it the pressure $P_1$ on the upstream side of the orifice is held at about twice or more higher than the pressure $P_2$ on the upstream side of the orifice.

The upstream pressure measured by the pressure gauge $P_1$ on the upstream side of the orifice is put to amplifier AP, and converted by A-D converter. The converted value is then compensated for temperature by temperature compensator M into a calculated flow rate Qc. This calculated Qc is the aforesaid instantaneous flow rate Q. Therefore, the equation $Qc=KP_1$ is established.

The set flow rate Qs is inputted from the flow rate setter SS. And the difference from the aforesaid calculated flow rate Qc is worked out as control signal Qy (Qy=Qs−Qc) by comparison circuit CC. The drive DV actuates control valve CV to bring the control signal Qy to zero.

The pressure $P_1$ on the upstream side of the orifice can be measured instantaneously. Therefore, the operation of control valve CV can be controlled at an electronic speed. In other words, it is possible to speed up the operation up to the mechanical limit of the control valve.

Therefore, even if the flow of gas in flow passage $S_2$ causes a transient change to pressure $P_1A$ in flow passage $S_1$, control valve CV responds at a high speed so that the flow rate through the orifice is quickly brought to the set flow rate Qs. That is because the pressure-type flow rate control system corrects transient mutual changes in flow passages at a high speed and thus a steady flow is maintained.

Figure 9:
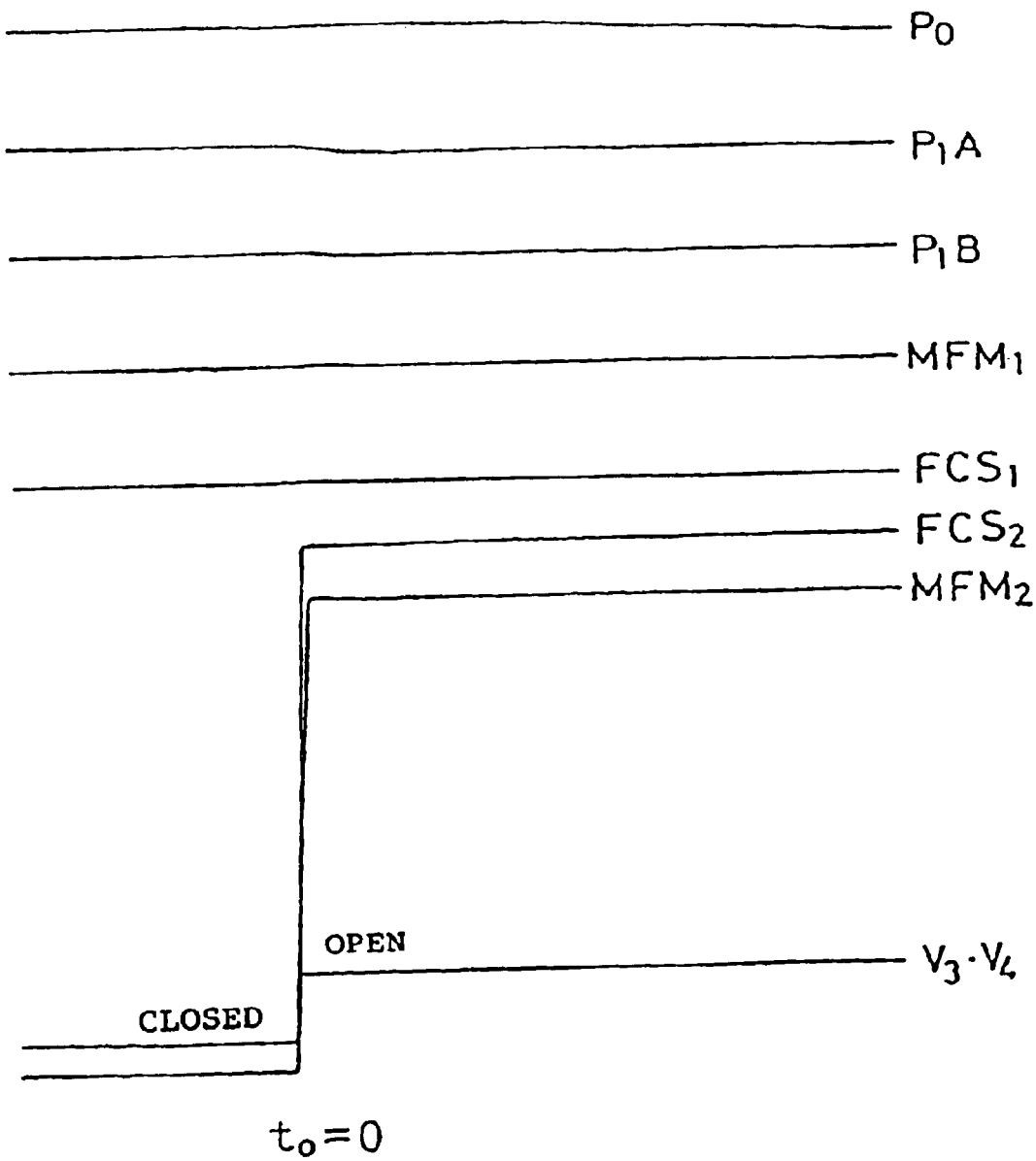
FIG. 9 is a time chart of various signals in the apparatus of FIG. 7.

FIG. 9 is a time chart of various signals in the embodiment shown in FIG. 7. If the pressure-type flow control system $FCS_2$ is actuated with valve $V_3$ and valve $V_4$ opened. $FCS_2$ signal and $MFM_2$ signal rise from zero to reach the steady value instantaneously. Yet, $FCS_1$ and $MFM_1$ signals in flow passage $S_1$ continue to stay at steady values, undergoing almost no changes.

In cases where the pressure-type flow control systems $FCS_2$, $FCS_1$ are used, no short stop time to is needed after the aforesaid valve $V_3$ and valve $V_4$ are opened, that is, $t_0=0$.

As set forth above, the pressure-type flow control system can quickly correct the interfering inaction between the flow passages by opening and closing a flow passage and can maintain the supply of fluid in a steady state.

EXAMPLE 3

Application Example or Fluid Switchable Pressure-Type Flow Control System

Figure 10:
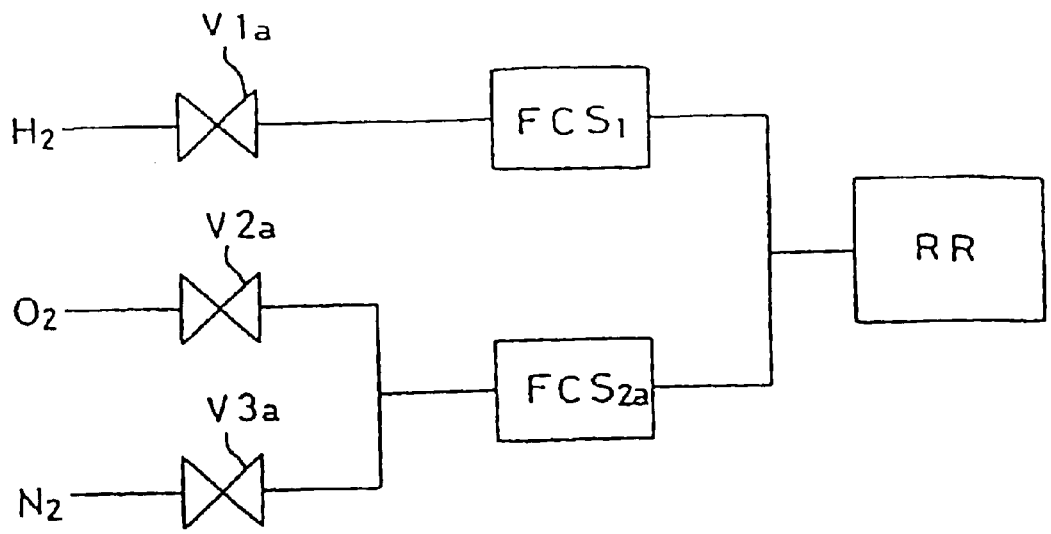
FIG. 10 is an arrangement diagram showing an application example of the fluid switchable pressure-type flow control system (FCS) in which three kinds of fluids are supplied through two FCS apparatuses at different flow rates.
Figure 18:
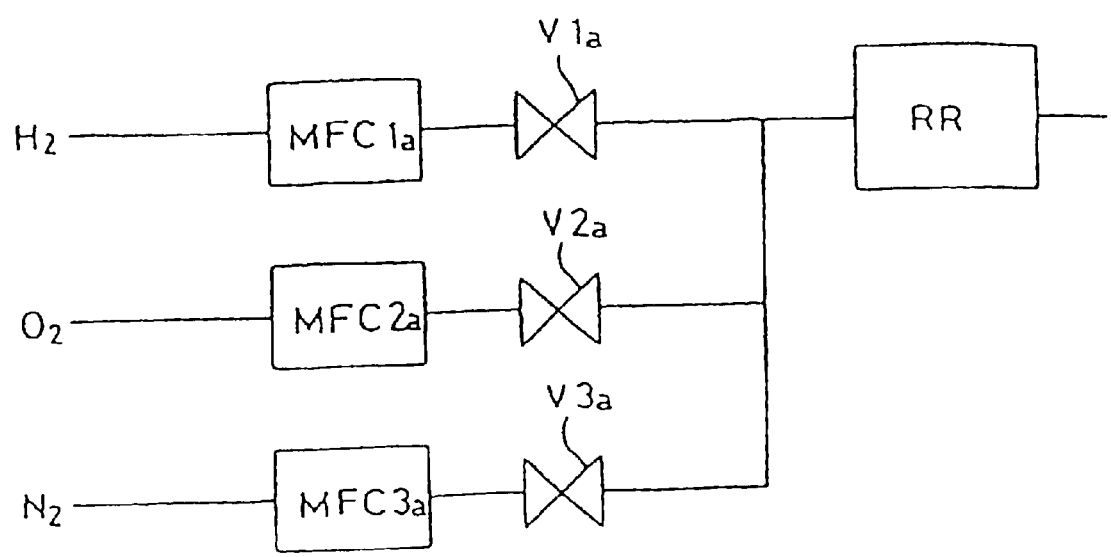
FIG. 18 is an arrangement diagram of a known high-purity moisture generating apparatus for semi-conductor manufacturing facilities.

FIG. 10 shows an application example of the fluid switchable pressure-type flow control system according to a still further embodiment of the present invention. This corresponds to the prior art using mass flow controllers shown in FIG. 18. The fluid switchable pressure-type flow control system is indicated by $FCS_{2a}$. That is, the flow rates of three kinds of gases—$H_2$ gas, $O_2$ gas and $N_2$ gas—are controlled by two pressure-type flow control systems $FCS_1$ and $FCS_{2a}$.

In FIG. 10, two pressure-type flow control systems $FCS_1$ and $FCS_{2a}$ are required to supply $H_2$ and $O_2$ simultaneously to the reactor RR. But $O_2$ and $N_2$ do not have to be fed to the reactor RR at the same time, and the fluid switchable pressure-type flow control system $FCS_{2a}$ can be used for control of the flow rates of both $O_2$ and $N_2$.

To generate moisture, the first step is to open valve $V_3a$ with valves $V_1a$, $V_2a$ closed to purge the reactor RR. Then, the valves $V_1a$, $V_2a$ are opened and the valve $V_3a$ is closed to feed $H_2$ gas and $O_2$ gas to the reactor RR. In the reactor RR, moisture, well balanced, is produced on a catalyst. This pure moisture is sent to downstream facilities.

It has been shown that $H_2$ gas and $O_2$ gas are sent into the reactor RR simultaneously. This is not always the case. In some cases, $O_2$ gas is first fed and then $H_2$ gas is supplied some time after that.

Needless to say, in case the flow rate of $O_2$ is controlled by a fluid switchable pressure-type flow control system $FCS_{2a}$, the aforesaid equation Q=FF ratio×$Q_N$ is applied.

EXAMPLE 4

Figure 11:
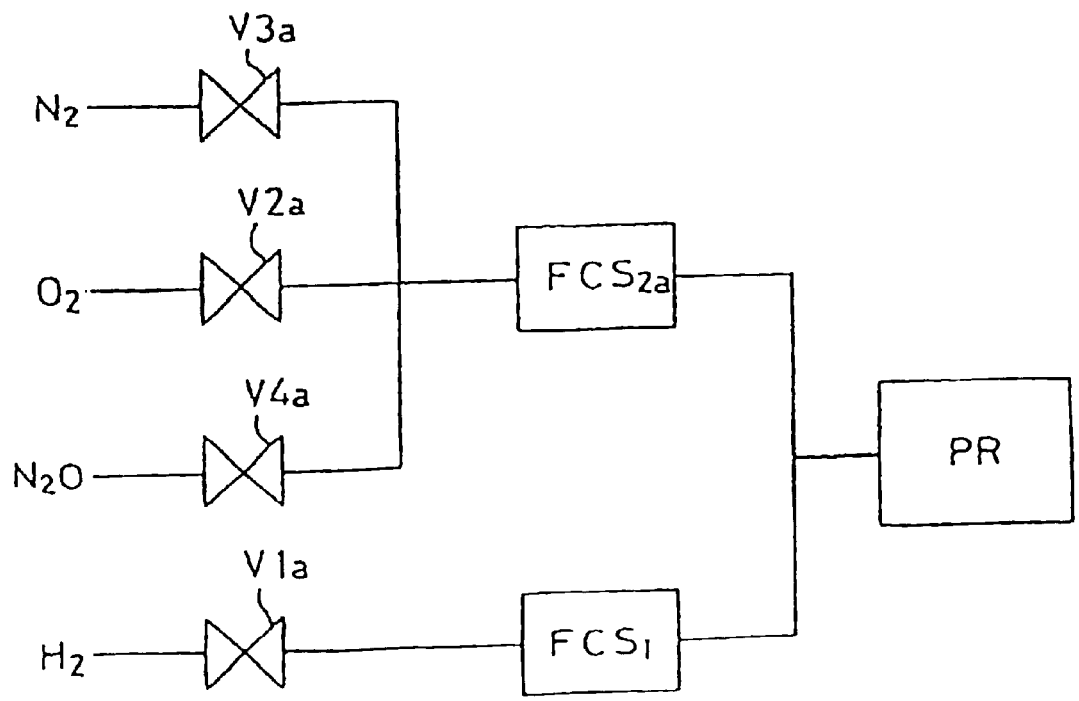
FIG. 11 is an arrangement diagram showing another application example of the fluid switchable pressure-type flow control system (FCS) in which four kinds of fluids are supplied through two FCS apparatuses at different flow rates.

Another Application Example of Fluid Switchable Pressure-Type Flow Control System FIG. 11 shows another application example of the fluid switchable pressure-type flow control system $FCS_{2a}$—an example where the fluid switchable pressure-type flow control system $FCS_{2a}$ is applied to the so-called single chamber multiple process in semiconductor manufacturing facilities. If Si is going to be nitrided immediately after oxidation in FIG. 11, for example, the system is first purged with $N_2$ gas and then $H_2$ gas and $O_2$ gas are supplied to the reactor RR to oxidize Si. Then, $N_2O$ gas is supplied to nitride the Si oxide film. Finally, $N_2$ gas is supplied to purge the system.

That is why the application example of the flow control system in FIG. 11 uses one pressure-type flow control system $FCS_1$ and one fluid switchable pressure-type now control system $FCS_{2a}$—a total of two units. But if this fluid supply apparatus is formed of the prior art mass-flow controllers alone, it will be necessary to install four units. That boosts the equipment costs greatly even if the expenses for standby units are excluded.

EXAMPLE 5

An Example of Fluid Switchable Pressure-Type now Control System

FIG. 12 is a block diagram of an embodiment of the fluid switchable pressure-type flow control system according to the present invention.

This fluid switchable pressure-type flow control system $FCS_{2a}$ comprises a control valve 2, its drive unit 4, a pressure detector 6, an orifice 8, a joint for taking gas 12, a flow rate calculation circuit 14, a gas type selection circuit 15, a flow rate setting circuit 16, an FF ratio storage means 17, a flow rate calculator 18, a flow rate display means 19 and a calculation control circuit 20.

The circuit 14 for calculation of flow rate is formed of a temperature detector 23, amplification circuits 22, 24, A-D converters 26, 28, a temperature compensation circuit 30 and a calculation circuit 32. The calculation control circuit 20 is made up of a comparison circuit 34 and an amplification circuit 36.

The aforesaid control valve 2 is equipped with the so-called direct touch-type metal diaphragm. Drive unit 4 is a piezoelectric element-type drive unit. Other types of drive units may also be used. They include magnetostrictive type or solenoid type, motor-driven, pneumatic type and thermal expansion type units.

The aforesaid pressure detector 6 is a semi-conductor strain type pressure sensor. Other types may also be used. They include the metal foil strain type, capacitance type, magnetic resistance type sensors.

The aforesaid temperature detector 23 is a thermocouple type temperature sensor. Other known temperature sensors such as resistance bulb type may be used instead.

The aforesaid orifice 8 is an orifice made of a plate-formed metal sheet gasket provided with a bore by cutting. In place of that, other orifices may be used. They include orifices with a bore formed in metal film by etching or electric discharge machining.

The gas type selection circuit 15 is a circuit to select a gas type among $H_2$ gas, $O_2$ gas and $N_2$ gas. The flow rate setting circuit 16 specifies its flow rate setting signal Qe to the calculation control circuit 20.

The FF ratio storage means 17 is a memory where the FF ratios to $N_2$ gas are stored. With $N_2$ gas as 1, the ratio for 0 is given as $FF_O/FF_N$ and $H_2$ gas as $FF_H/FF_N$. $FF_N$, $FF_O$ and $FF_H$ are flow factors of $N_2$, $O_2$ and $H_2$ respectively. Calculation and storing of FF ratios may be arranged this way, for example. There is provided an FF calculator (not shown) which reads data from the FF storage means and works out FF ratios. The calculated FF ratios are stored in the FF ratio storage means 17.

The flow rate calculator 18 works out the flow rate Q of the flowing gas type by Q=FF ratio×$Q_N$ ($Q_N$: corresponding $N_2$ gas flow rate) using the FF ratio. The value is then shown on the flow rate display means 19.

The operation of this fluid switchable pressure-type flow control system $FCS_{2a}$ will now be explained.

First, let it be assumed that the whole apparatus is initialized with $N_2$ gas as a reference or basis.

The gas type selection circuit 15 selects $N_2$ gas, and the flow rate setting Circuit 16 specifies flow rate setting signal $Q_e$. Control valve 2 is opened, and the gas pressure $P_1$ on the upstream side of the orifice is detected by pressure detector 6. The data is sent through the amplifier 22 and the A-D converter 26 to produce digitized signals. The digitized signals are then outputted into the calculation circuit 32.

Similarly, the gas temperature $T_1$ on the upstream side of the orifice is detected by temperature detector 23 and sent to the amplifier 24 and the A-D converter 28. Thus, data is digitized and the digitized temperature signals are inputted in the temperature compensation circuit 30.

In the calculation circuit 32, the flow rate Q is worked out by the equation Q=$KP_1$ using the pressure signal $P_1$. At the same time, the aforesaid flow rate Q is temperature-compensated with the compensation signals from the temperature compensation circuit 30. The calculated flow rate $Q_c$ is then outputted to the comparison circuit 34. The constant K in the equation is set for $N_2$ gas as mentioned earlier.

The difference signal $Q_y$ between the calculated flow rate $Q_c$ and the flow rate setting signal $Q_c$ is outputted from the comparison circuit 34 through the amplification circuit 36. Then the drive unit 4 actuates and operates the control valve 2 so that the difference signal $Q_y$ is reduced zero. A series of those steps sends out $N_2$ gas to the reactor RR in FIG. 11 at a specific flow rate.

In the FF ratio storage means 17, the now factor ratio for $N_2$ gas, that is 1, is selected. In the flow rate calculator 18, it is found from Q=1×$Q_c$ that Q=$Q_c$. The flow rate display means 19 displays the flow rate $Q_c$ of $N_2$ gas.

Then, the gas type selection circuit 15 selects $O_2$ gas, and its set flow rate $Q_c$ is specified by the flow rate setting circuit 16. The aforesaid constant K is set for $N_2$ gas, and therefore the signal $Q_c$ is set in terms of $N_2$ gas in the present example. Similarly, the control valve 2 is so adjusted that the flow rate $Q_c$ calculated by the equation $Q_c$=$KP_1$ becomes equal to $Q_e$.

Even if the calculated $Q_c$ is equal to the flow rate setting signal $Q_e$, the gas actually flowing through the orifice 8 is $O_2$ gas. The actual gas flow rate Q through the orifice 8 is Q=$FF_O/FF_N$×$Q_c$.

In the FF ratio storage means 17, therefore, $FF_O/FF_N$ is selected as flow factor ratio. In the flow rate calculator 18, the $O_2$ gas flow rate is calculated by the equation Q=$FF_O/FF_N$×$Q_c$, and the calculated value is shown on the flow rate display means 19.

In the present embodiment, even if $O_2$ gas is selected, the flow rate setting circuit 16 does not specify the actual now rate but outputs the flow rate setting signal $Q_c$ in terms of the corresponding $N_2$ gas flow rate.

EXAMPLE 6

A Second Example of Fluid Switchable Pressure-Type Flow Control System

Figure 13:
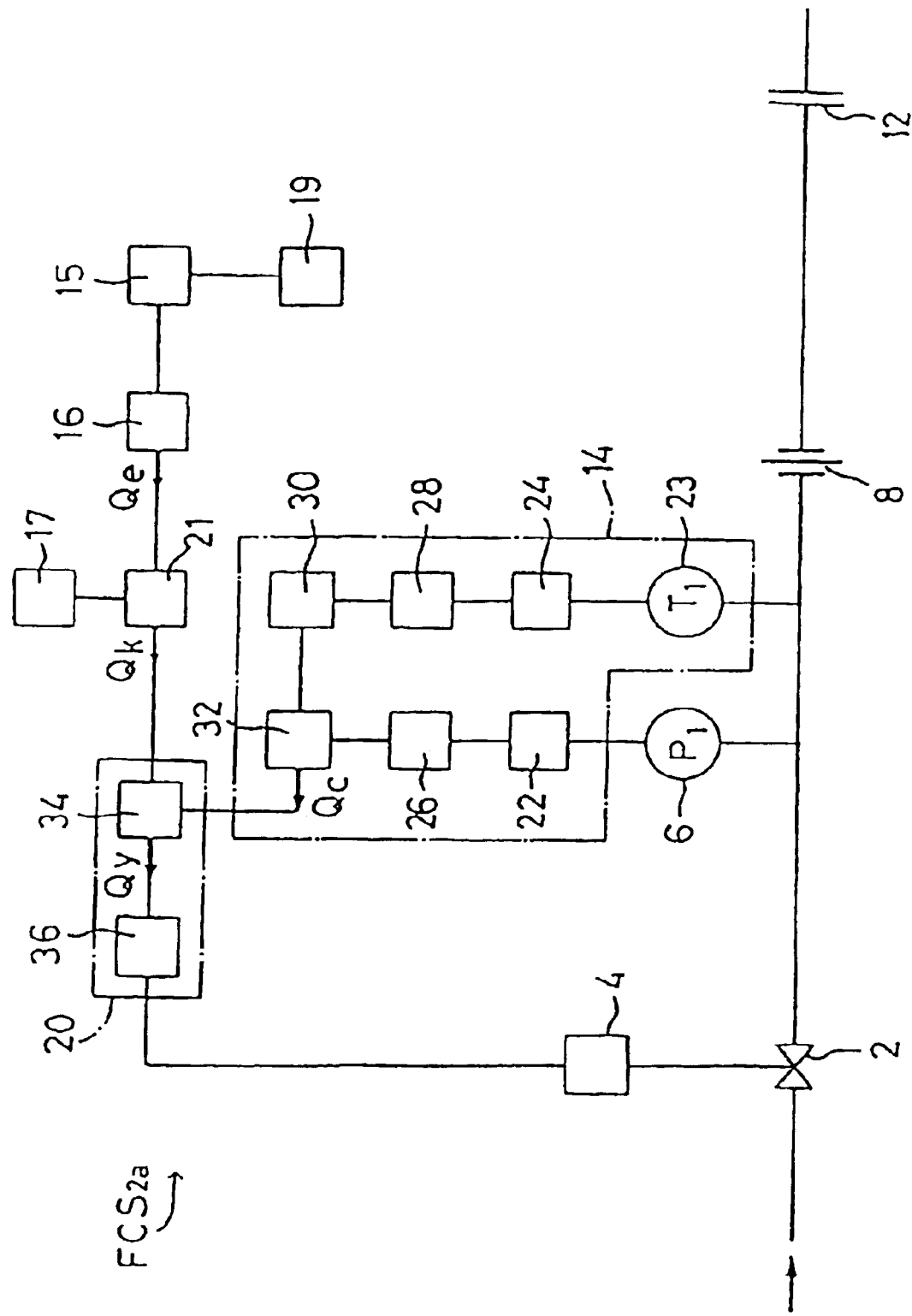
FIG. 13 is a block diagram of another fluid switchable pressure-type flow control system (FCS) according to the embodiment of FIG. 12.
Figure 14:
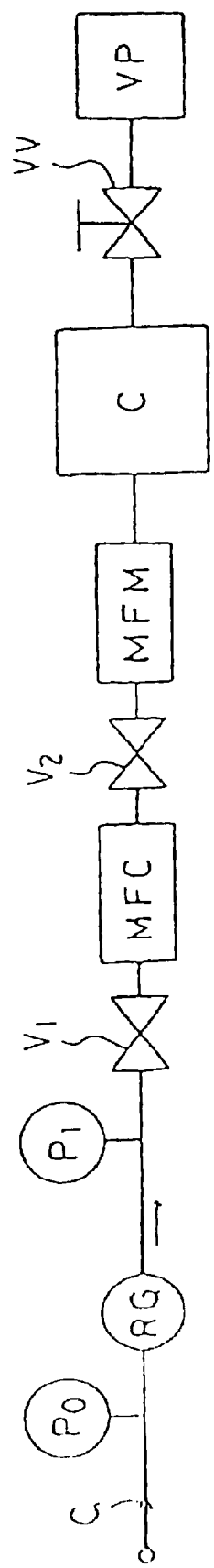
FIG. 14 is a schematic diagram of the prior art single flow passage fluid supply apparatus.

FIG. 13 is a block diagram of a second embodiment of the fluid switchable pressure-type flow control system improved in that point. What is different from FIG. 3 is that there is added an FF inverse ratio calculation circuit 21 with an FF ratio storage means 17.

If, for example, the gas type selection circuit 15 selects the $O_2$ gas, the flow rate setting circuit 16 outputs the actual now rate of $O_2$ gas as now rate Setting signal $Q_c$. This signal $Q_c$ is converted into the flow rate corresponding to that of $N_2$ gas by the FF inverse ratio calculation circuit 21 using the FF ratio of the FF ratio storage means 17. That is, $Q_c$ is multiplied by the reciprocal number of the FF ratio and converted into the signal $Q_k$ corresponding to that of $N_2$ gas by the equation $Q_k$=1($FF_O/FF_N$)×$Q_c$. That is because the fluid switchable pressure-type flow control system is initialized with $N_2$ gas.

In the embodiment of FIG. 13, the flow rate calculator 18 is not needed. Since the flow rate setting signal $Q_c$ itself is the flow rate of $O_2$ gas, all that has to be done is to show this flow rate setting signal $Q_c$ on the flow rate display means 19. Needless to say, the same is the case with $H_2$ gas and $N_2$ gas.

To summarize, the parallel divided flow type fluid supply apparatus according to the present invention can minimize the effect on other flow passages of a flow passage being opened to allow fluid to flow, because a mass flow controller is provided with a time delay feature. Therefore, the other flow passages can be maintained in a steady flow state. One regulator can control a plurality of flow passages in a steady flow state.

In the apparatus according to fourth embodiment, the delay time of the mass flow controller can be freely changed and set. The apparatus achieves the most effective control to keep the flow rate steady.

In the apparatus according to the fourth embodiment, a pressure-type flow control system is adopted as a flow controller that permits high-speed control of the flow rates of the respective flow passages. The high-speed action can absorb the interfering transient changes among the low passages, thereby making it possible to control and keep the respective flow passages in a stead % state at a high speed and without failure.

The invention according to yet another embodiment provides a method of using one pressure-type flow control system for a number of different types of gases, because even if the pressure-type flow control system is initialized for gas type A ($N_2$ gas, for example), the flow rate can be converted through the flow factor into the flow rate of any gas type B. Thus materialized is a method of dealing with a wide range of gas types at low cost and with high precision unlike the prior art flow rate control apparatus using a mass flow meter or the flow control method in which the mass flow meter is merely replaced with the pressure-type flow control system.

While the invention has been particularly shown and described with reference to preferred embodiments, it will be understood by those skilled in this art that various changes and modifications may be made therein without departing from the spirit and scope of the invention.

LIST OF REFERENCE NUMBERS AND CHARACTERS

AMP, $AP_1$, $AP_2$=amplifiers
A/D=A-D converter
BG=bridge circuit
BP=bypass circuit
C=reaction chamber
CC=comparison circuit
CV=control valve
CCC=calculation control circuit
$DMFC_1$. $DMFC_2$=time delay type mass flow controllers
DP=display
DT=time delay unit
DS=downstream sensor
DV=drive
$FCS_1$, $FCS_2$=pressure-type flow control systems
M=temperature compensator
MFC=mass flow controller
MFC, $MFC_1$, $MFC_2$=mass flow controllers
MFM, $MFM_1$, $MFM_2$=mass flow meters
OR=orifice
Po, $P_1A$, $P_2B$=pressure gauges
$P_1$=pressure on the upstream side of the orifice
$P_2$=pressure on the downstream side of the orifice
$P_s$=power source
$Q_c$=calculated flow rate
$Q_s$=set flow rate
RG, $RG_1$, $RG_2$=regulators
$S_1$, $S_2$=flow passages
SP=sensor
SS, ST=flow rate setting means
$t_0$=short stop time
$\Delta t$=delay time
US=upstream sensor
VP=valve unit
$V_1$~$V_4$, VV, $VV_1$, $VV_2$=valves
$VP_1$, $VP_2$=vacuum pumps
2=control valve
4=drive unit
6=pressure detector
8=orifice
12=joint for taking out gas
14=circuit for calculation of flow rate
15=circuit for selection of gas type
16=circuit for setting the flow rate
17=FF ratio storage means
18=flow rate calculation means
19=flow rate display means
20=calculation control circuit
21=FF inverse ratio calculation circuit
22, 24=amplifier
23=temperature detector
26, 28=A-D converters
30=temperature compensation circuit
33=calculation circuit
34=comparison circuit
36=amplification circuit
$FCS_1$=pressure-type flow control system
$FCS_{2a}$=pressure-type flow control system
$Q_c$=calculated flow rate signal
$Q_e$=flow rate setting signal
Qk=signals corresponding to the flow rate of N, gas
$V_1a$ ~$V_4a$=valves.

What is claimed:

1. A parallel divided flow fluid supply apparatus, comprising:
  (a) a pressure regulator having an upstream side and a downstream side;
  (b) a plurality of parallel flow passages disposed downstream of the pressure regulator, wherein a single flow of fluid from the pressure regulator is branched into the parallel flow passages;
  (c) a plurality of flow control valves disposed in the flow passages; and
  (d) a plurality of pressure flow control systems for controlling of the flow rate, one controller installed on each flow passage between two of the flow control valves disposed upstream and downstream of the controller respectively, wherein each pressure flow control system comprises:
    (i) an orifice formed downstream of the control system and upstream of the downstream flow control valve for discharging fluid from the flow passage;
    (ii) a control valve installed upstream of the orifice and downstream of the upstream flow control valve of the control system for controlling the flow rate of the fluid;
    (iii) a pressure detector disposed between the orifice and the control valve for detecting the pressure $P_1$ between the control valve and the orifice;
    (iv) a calculation control circuit, wherein with a pressure on an upstream side of the orifice set to be twice or more higher than a pressure on a downstream side of the orifice, the instantaneous flow rate Qc is calculated as Qc=$KP_1$, where K is a constant, from the pressure $P_1$ on the upstream side of the orifice detected by the pressure detector, and a difference between an instantaneous flow rate Qc and a preset flow rate Qs is outputted as control signal Qy; and
    (v) a drive connecting the control valve and the calculation control circuit for receiving the control signal from the calculation control circuit and for sending the control signal to the control valve causing the control valve to operate to bring the control signal Qy to zero, wherein
    the plurality of pressure flow control systems operate to correct transient mutual pressure changes in the plurality of flow passages, thereby maintaining steady fluid flow.

2. A parallel divided flow fluid supply apparatus, comprising:
 (a) a pressure regulator having an upstream side and a downstream side;
 (b) a plurality of parallel flow passages disposed downstream of the pressure regulator, wherein a single flow of fluid from the pressure regulator is branched into the parallel flow passages, wherein the plurality of parallel flow passages includes a first flow passage disposed in parallel with a second flow passage;
 (c) a plurality of flow control valves disposed in the flow passages; and
 (d) a plurality of pressure flow control systems for controlling of the flow rate, one controller installed on each flow passage between two of the flow control valves disposed upstream and downstream of the controller respectively, wherein each pressure flow control system comprises:
  (i) an orifice formed downstream of the control system and upstream of the downstream flow control valve for discharging fluid from the flow passage;
  (ii) a control valve installed upstream of the orifice and downstream of the upstream flow control valve of the control system for controlling the flow rate of the fluid;
  (iii) a pressure detector disposed between the orifice and the control valve for detecting the pressure $P_1$ between the control valve and the orifice;
  (iv) a calculation control circuit, wherein with a pressure on an upstream side of the orifice set to be twice or more higher than a pressure on a downstream side of the orifice, the instantaneous flow rate Qc is calculated as $Qc=KP_1$, where K is a constant, from the pressure $P_1$ on the upstream side of the orifice detected by the pressure detector, and a difference between an instantaneous flow rate Qc and a preset flow rate Qs is outputted as control signal Qy; and
  (v) a drive connecting the control valve and the calculation control circuit for receiving the control signal from the calculation control circuit and for sending the control signal to the control valve causing the control valve to operate to bring the control signal Qy to zero, wherein
 the pressure flow control system installed on the first flow passage between two flow control valves operates to correct transient pressure chances in the first flow passage, thereby maintaining steady fluid flow in the first flow passage.

3. A parallel divided flow fluid supply apparatus as recited in claim 2, wherein the pressure flow control system installed on the second flow passage between two flow control valves operates to correct transient pressure changes in the second flow passage, thereby maintaining steady fluid flow in the second flow passage.

4. A parallel divided flow fluid supply apparatus, comprising:
 (a) a pressure regulator having an upstream side and a downstream side;
 (b) a first flow passage and a second flow passage disposed in parallel with each other and downstream of the pressure regulator, wherein a single flow of fluid from the pressure regulator is branched into the parallel flow passages;
 (c) a plurality of flow control valves disposed in the flow passages; and
 (d) a plurality of pressure flow control systems for controlling of the flow rate, one controller installed on each flow passage between two of the flow control valves disposed upstream and downstream of the controller respectively, wherein each pressure flow control system comprises:
  (i) an orifice formed downstream of the control system and upstream of the downstream flow control valve for discharging fluid from the flow passage;
  (ii) a control valve installed upstream of the orifice and downstream of the upstream flow control valve of the control system for controlling the flow rate of the fluid;
  (iii) a pressure detector disposed between the orifice and the control valve for detecting the pressure $P_1$ between the control valve and the orifice;
  (iv) a calculation control circuit, wherein with a pressure on an upstream side of the orifice set to be twice or more higher than a pressure on a downstream side of the orifice, the instantaneous flow rate Qc is calculated as $Qc=KP_1$, where K is a constant, from the pressure $P_1$ on the upstream side of the orifice detected by the pressure detector, and a difference between an instantaneous flow rate Qc and a preset flow rate Qs is outputted as control signal Qy; and
  (v) a drive connecting the control valve and the calculation control circuit for receiving the control signal from the calculation control circuit and for sending the control signal to the control valve causing the control valve to operate to bring the control signal Qy to zero, wherein
 the pressure flow control system installed on the first flow passage between two flow control valves operates to correct transient pressure changes in the first flow passage, thereby maintaining steady fluid flow in the first flow passage.

5. A parallel divided flow fluid supply apparatus as recited in claim 4, wherein the pressure flow control system installed on the second flow passage between two flow control valves operates to correct transient pressure changes in the second flow passage, thereby maintaining steady fluid flow in the second flow passage.

6. A parallel divided flow fluid supply apparatus, comprising:
 (a) a pressure regulator having an upstream side and a downstream side;
 (b) a plurality of parallel flow passages disposed downstream of the pressure regulator, wherein a single flow of fluid from the pressure regulator is branched into the parallel flow passages, wherein the plurality of parallel flow passages includes a first flow passage disposed in parallel with a second flow passage;
 (c) a plurality of flow control valves disposed in the flow passages; and
 (d) a plurality of pressure flow control systems for controlling of the flow rate, one controller installed on each flow passage between two of the flow control valves disposed upstream and downstream of the controller respectively, wherein each pressure flow control system comprises:
  (i) an orifice formed downstream of the control system and upstream of the downstream flow control valve for discharging fluid from the flow passage;
  (ii) a control valve installed upstream of the orifice and downstream of the upstream flow control valve of the control system for controlling the flow rate of the fluid;
  (iii) a pressure detector disposed between the orifice and the control valve for detecting the pressure $P_1$ between the control valve and the orifice;

(iv) a calculation control circuit, wherein with a pressure on an upstream side of the orifice set to be twice or more higher than a pressure on a downstream side of the orifice, the instantaneous flow rate Qc is calculated as $Qc=KP_1$, where K is a constant, from the pressure $P_1$ on the upstream side of the orifice detected by the pressure detector, and a difference between an instantaneous flow rate Qc and a preset flow rate Qs is outputted as control signal Qy; and (v) a drive connecting the control valve and the calculation control circuit for receiving the control signal from the calculation control circuit and for sending the control signal to the control valve causing the control valve to operate to bring the control signal Qy to zero, wherein the pressure flow control system installed on the first flow passage between two flow control valves and the pressure flow control system installed on the second flow passage between two flow control valves operate to correct transient mutual pressure changes in the first flow passage and the second flow passage, thereby maintaining steady fluid flow in the first flow passage and the second flow passage.

7. A parallel divided flow fluid supply apparatus, comprising:

(a) a pressure regulator having an upstream side and a downstream side;

(b) a first flow passage and a second flow passage disposed in parallel with each other and downstream of the pressure regulator, wherein a single flow of fluid from the pressure regulator is branched into the parallel flow passages;

(c) a plurality of flow control valves disposed in the flow passages; and (d) a plurality of pressure flow control systems for controlling of the flow rate, one controller installed on each flow passage between two of the flow control valves disposed upstream and downstream of the controller respectively, wherein each pressure flow control system comprises:

(i) an orifice formed downstream of the control system and upstream of the downstream flow control valve for discharging fluid from the flow passage;

(ii) a control valve installed upstream of the orifice and downstream of the upstream flow control valve of the control system for controlling the flow rate of the fluid;

(iii) a pressure detector disposed between the orifice and the control valve for detecting the pressure $P_1$ between the control valve and the orifice;

(iv) a calculation control circuit, wherein with a pressure on an upstream side of the orifice set to be twice or more higher than a pressure on a downstream side of the orifice, the instantaneous flow rate Qc is calculated as $Qc=KP_1$, where K is a constant, from the pressure $P_1$ on the upstream side of the orifice detected by the pressure detector, and a difference between an instantaneous flow rate Qc and a preset flow rate Qs is outputted as control signal Qy, and (v) a drive connecting the control valve and the calculation control circuit for receiving the control signal from the calculation control circuit and for sending the control signal to the control valve causing the control valve to operate to bring the control signal Qy to zero, wherein the pressure flow control system installed on the first flow passage between two flow control valves and the pressure flow control system installed on the second flow passage between two flow control valves operate to correct transient mutual pressure changes in the first flow passage and the second flow passage, thereby maintaining steady fluid flow in the first flow passage and the second flow passage.

* * * * *